E. A. TELFAIR.
PASTEBOARD BOX MACHINE.
APPLICATION FILED MAR. 7, 1910.
1,054,473.
Patented Feb. 25, 1913.
16 SHEETS—SHEET 2.
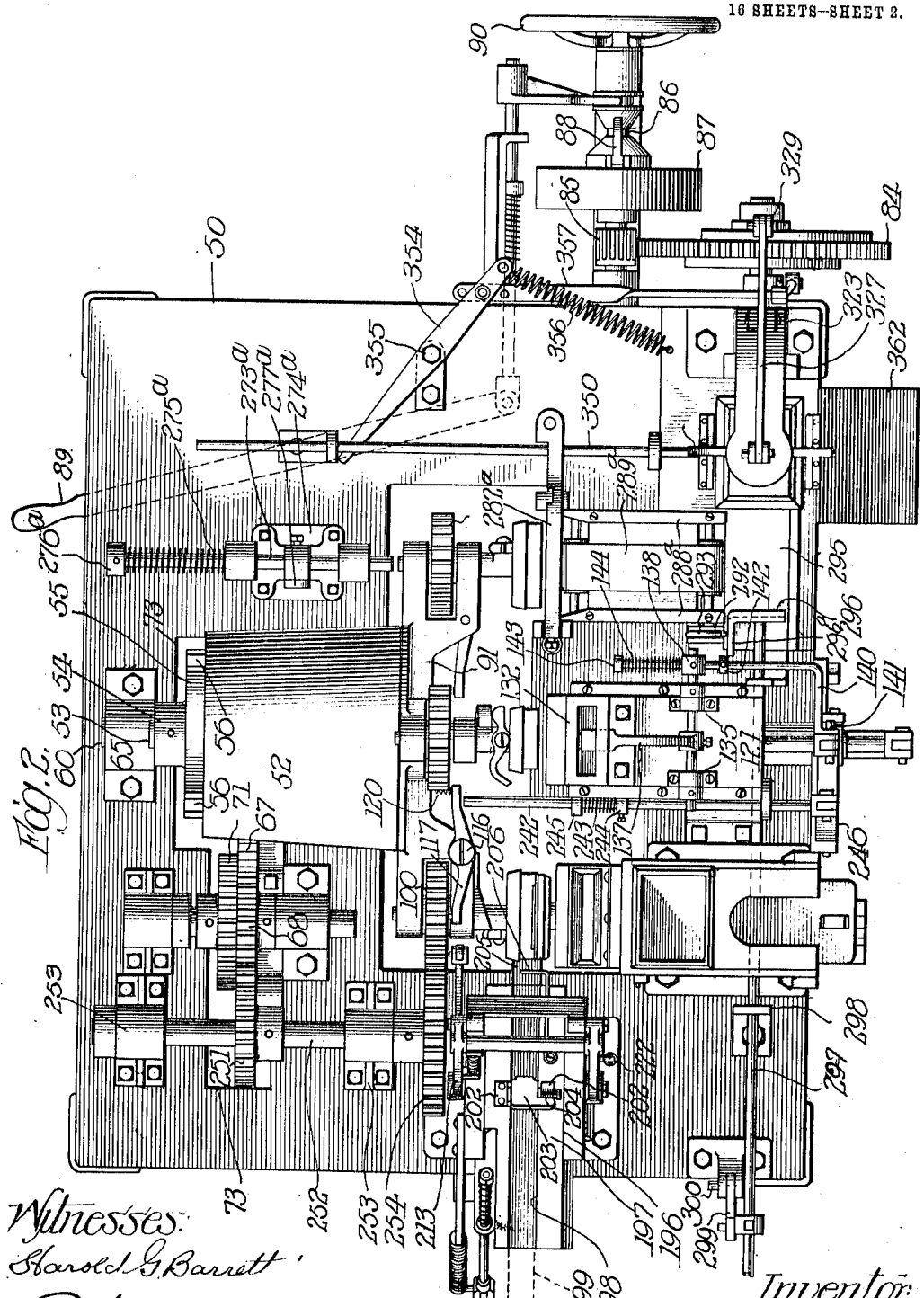

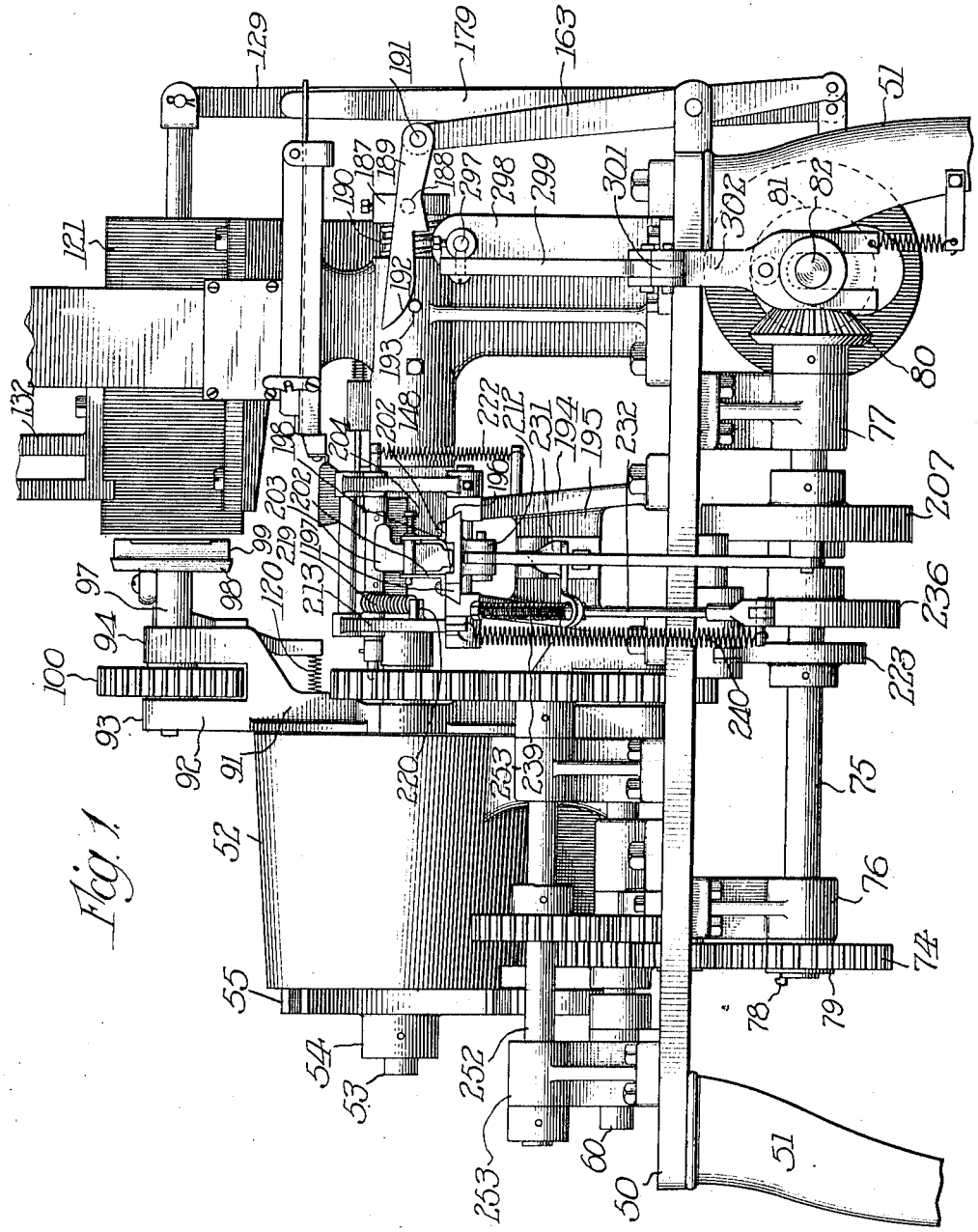

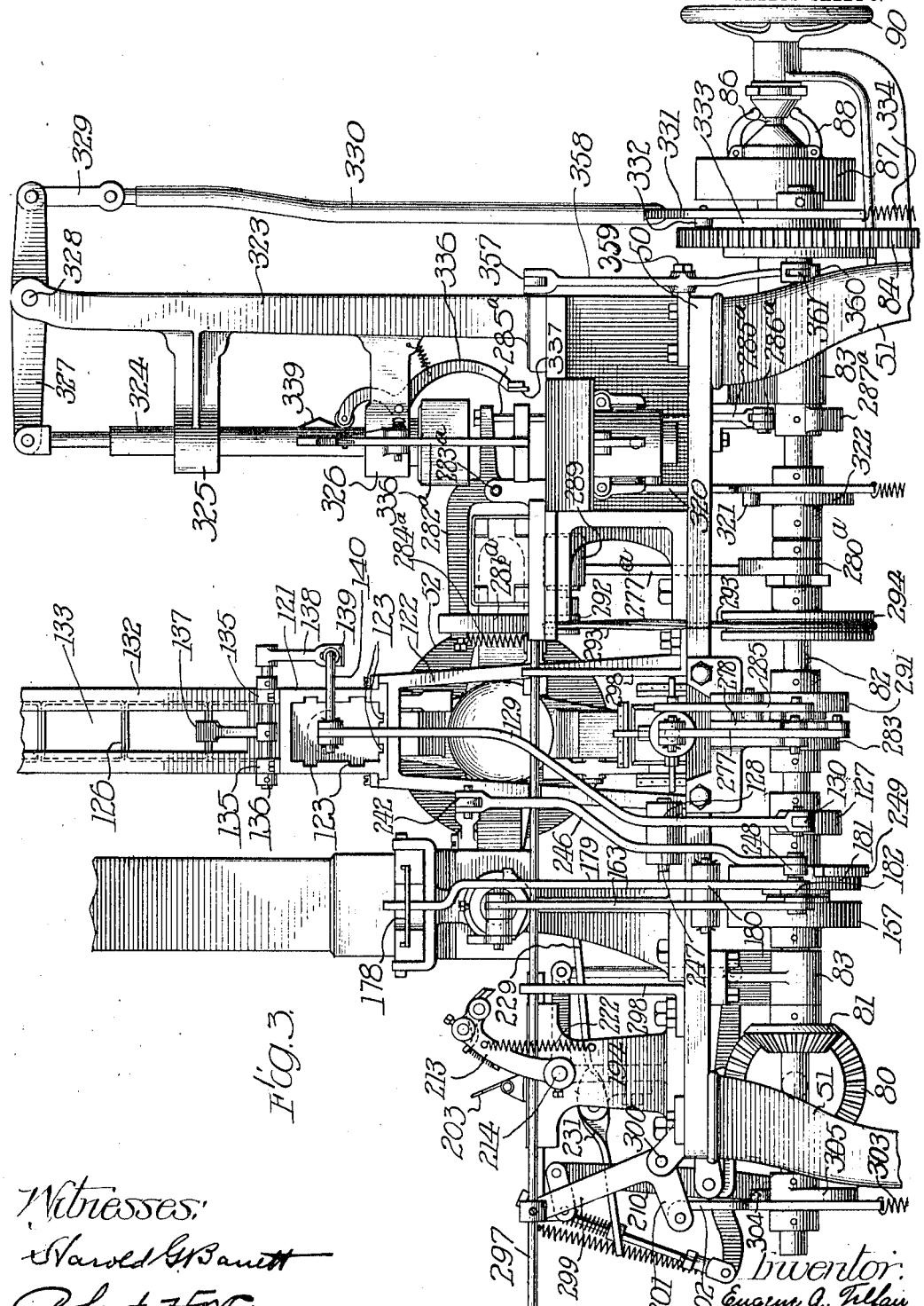

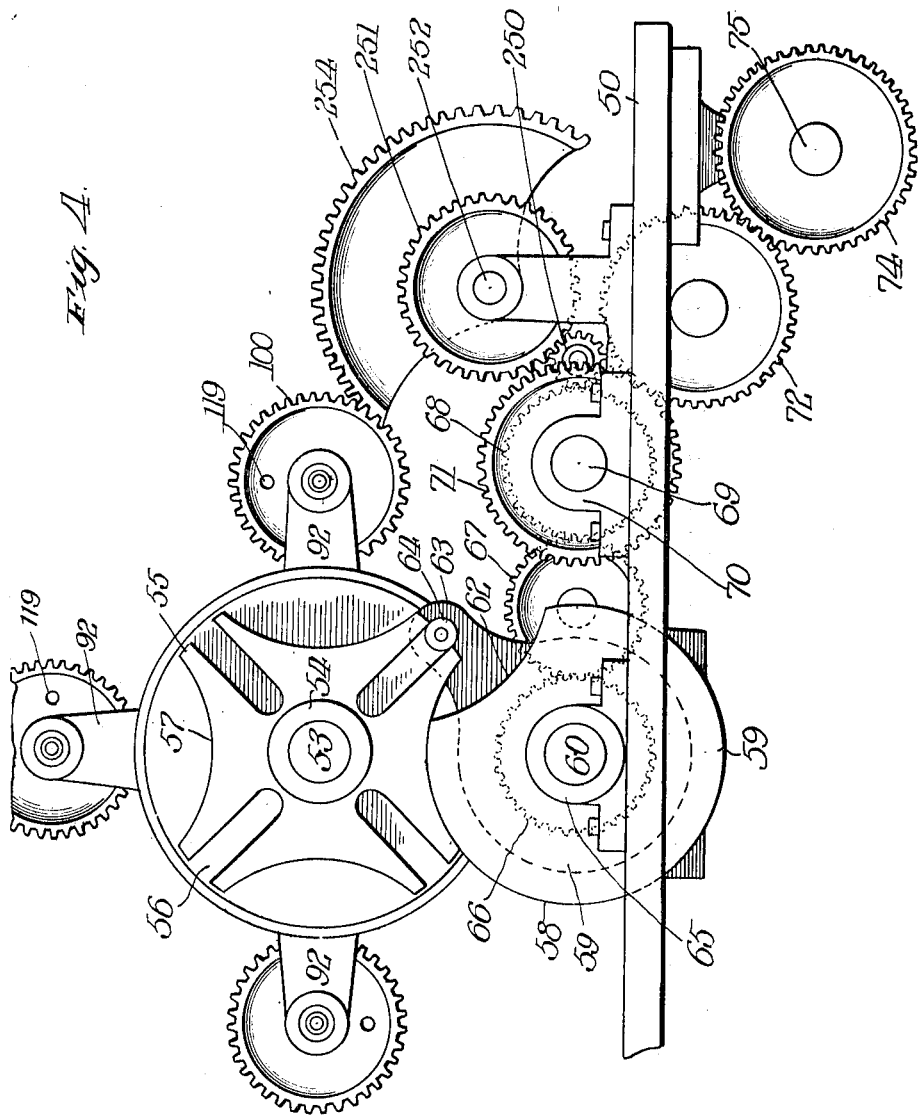

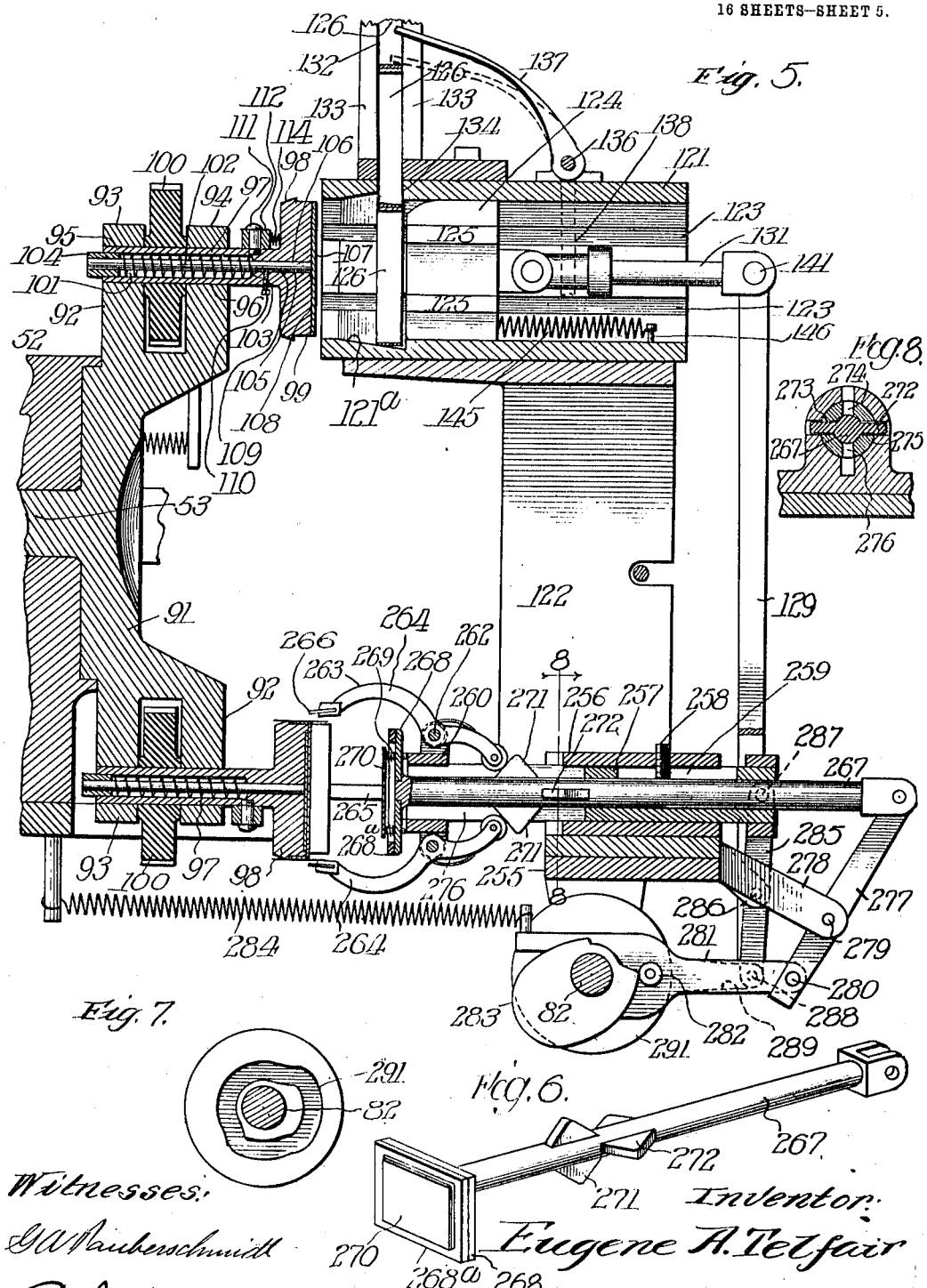

E. A. TELFAIR.
PASTEBOARD BOX MACHINE.
APPLICATION FILED MAR. 7, 1910.
1,054,473.
Patented Feb. 25, 1913.
16 SHEETS—SHEET 6.
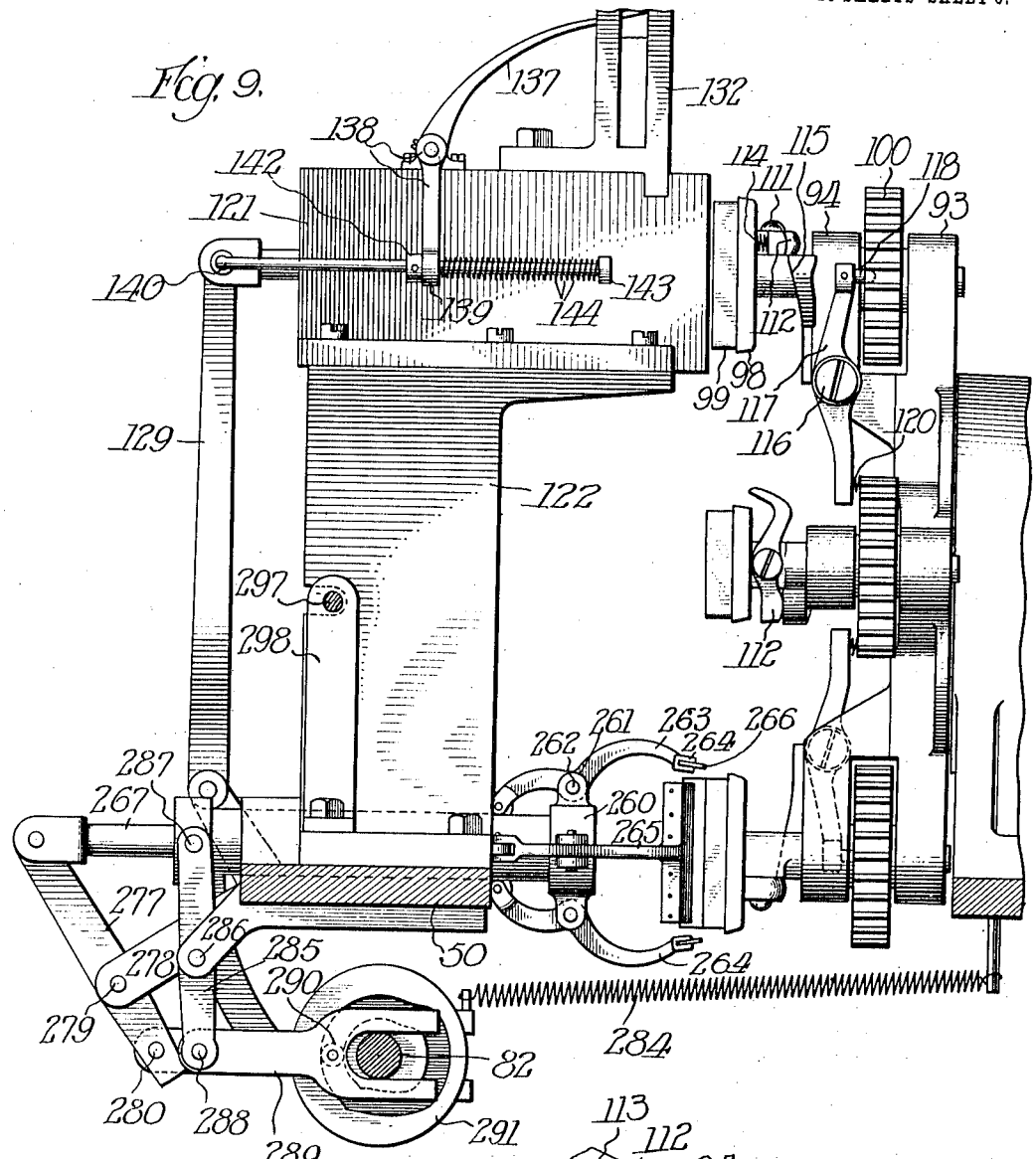
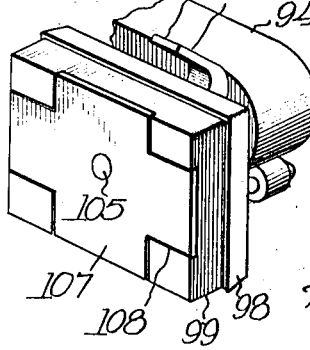

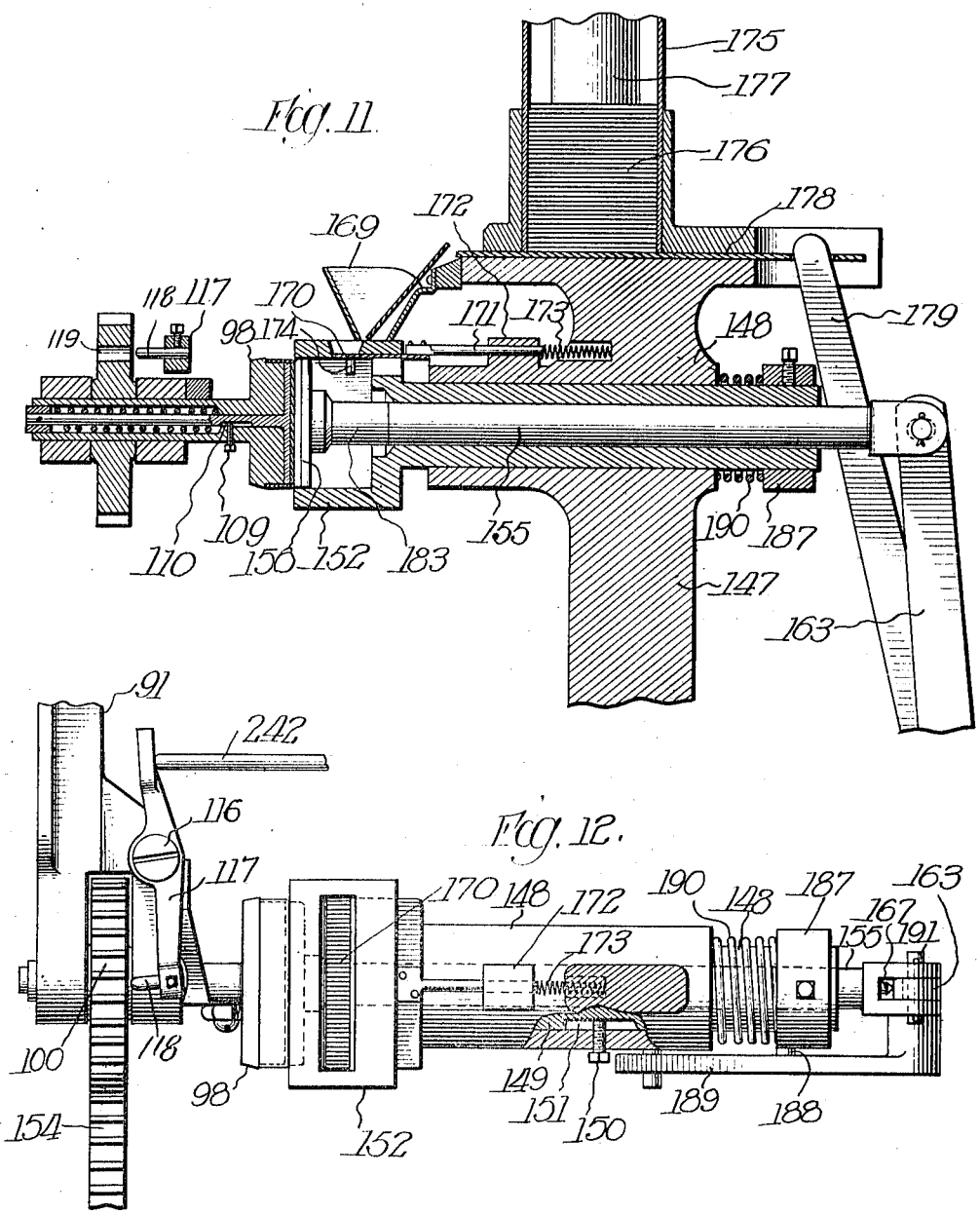

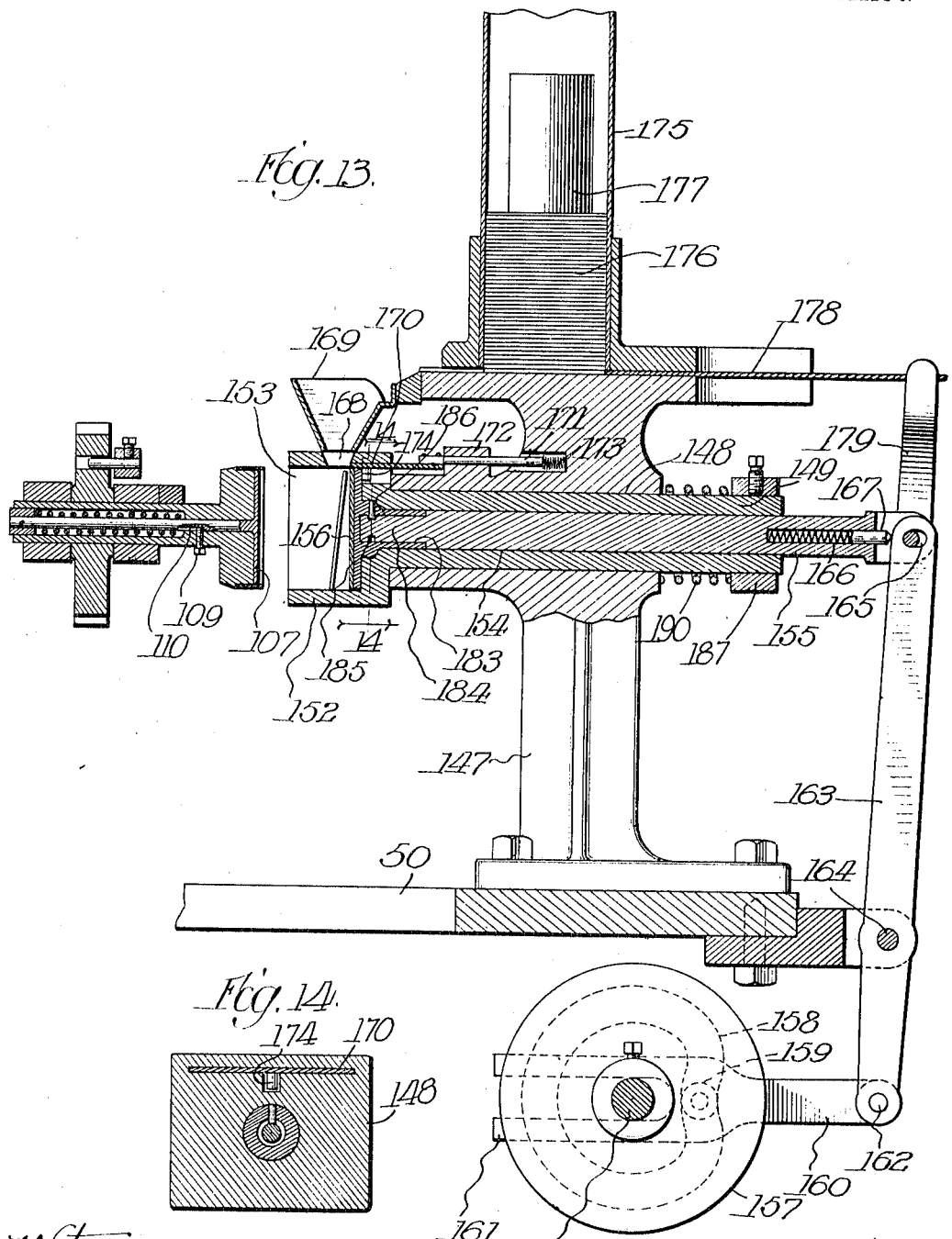

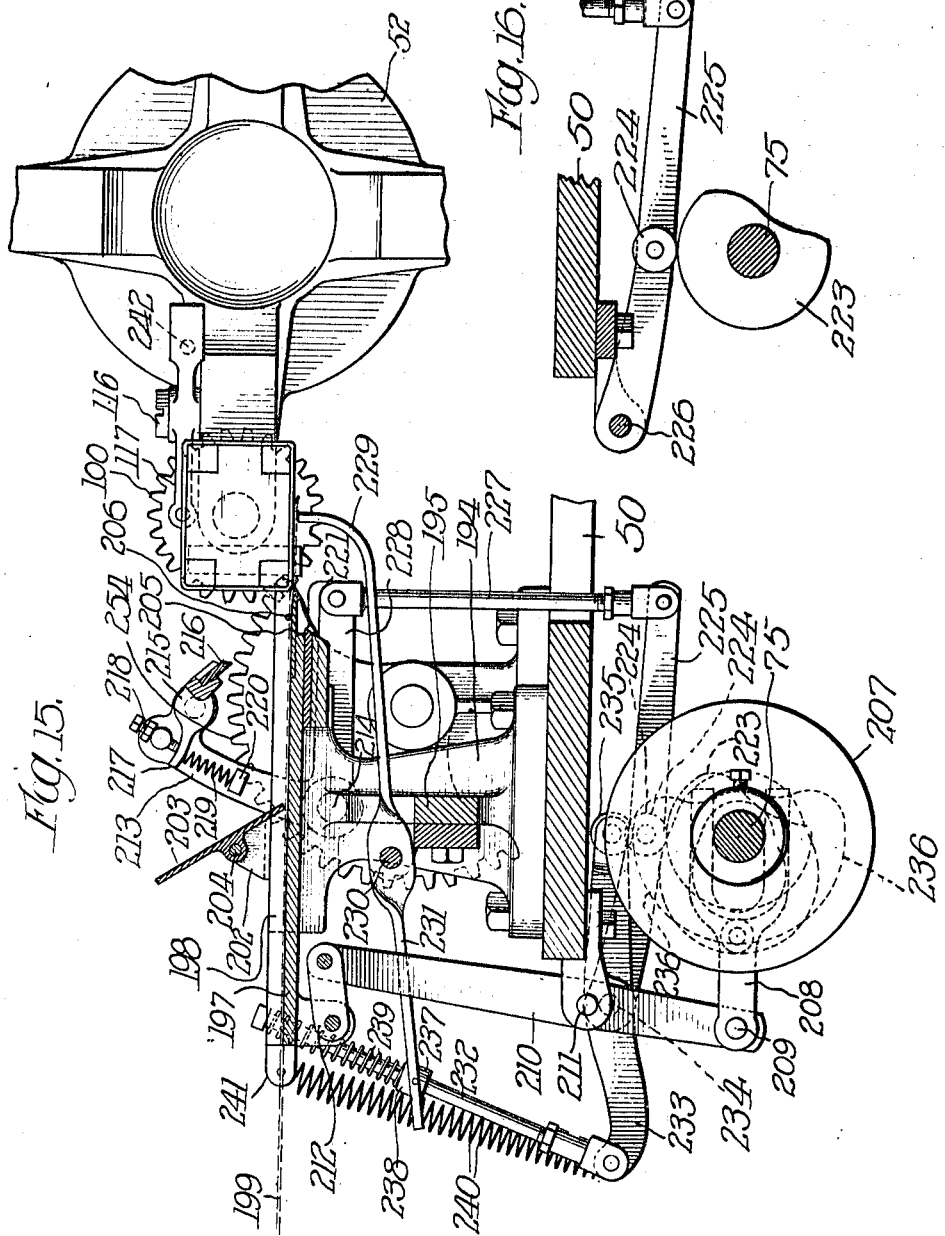

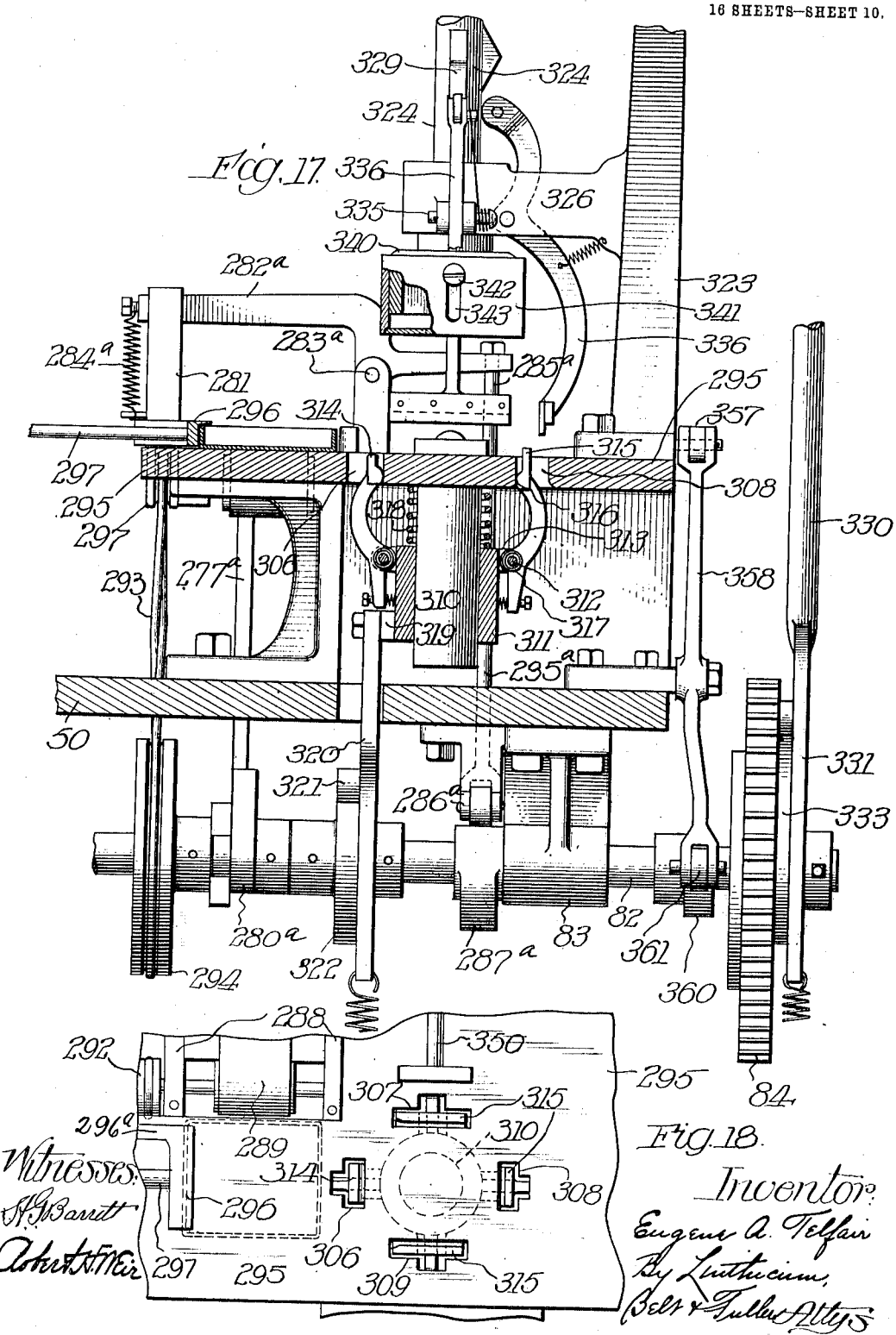

E. A. TELFAIR.
PASTEBOARD BOX MACHINE.
APPLICATION FILED MAR. 7, 1910.
1,054,473.
Patented Feb. 25, 1913.
16 SHEETS—SHEET 11.
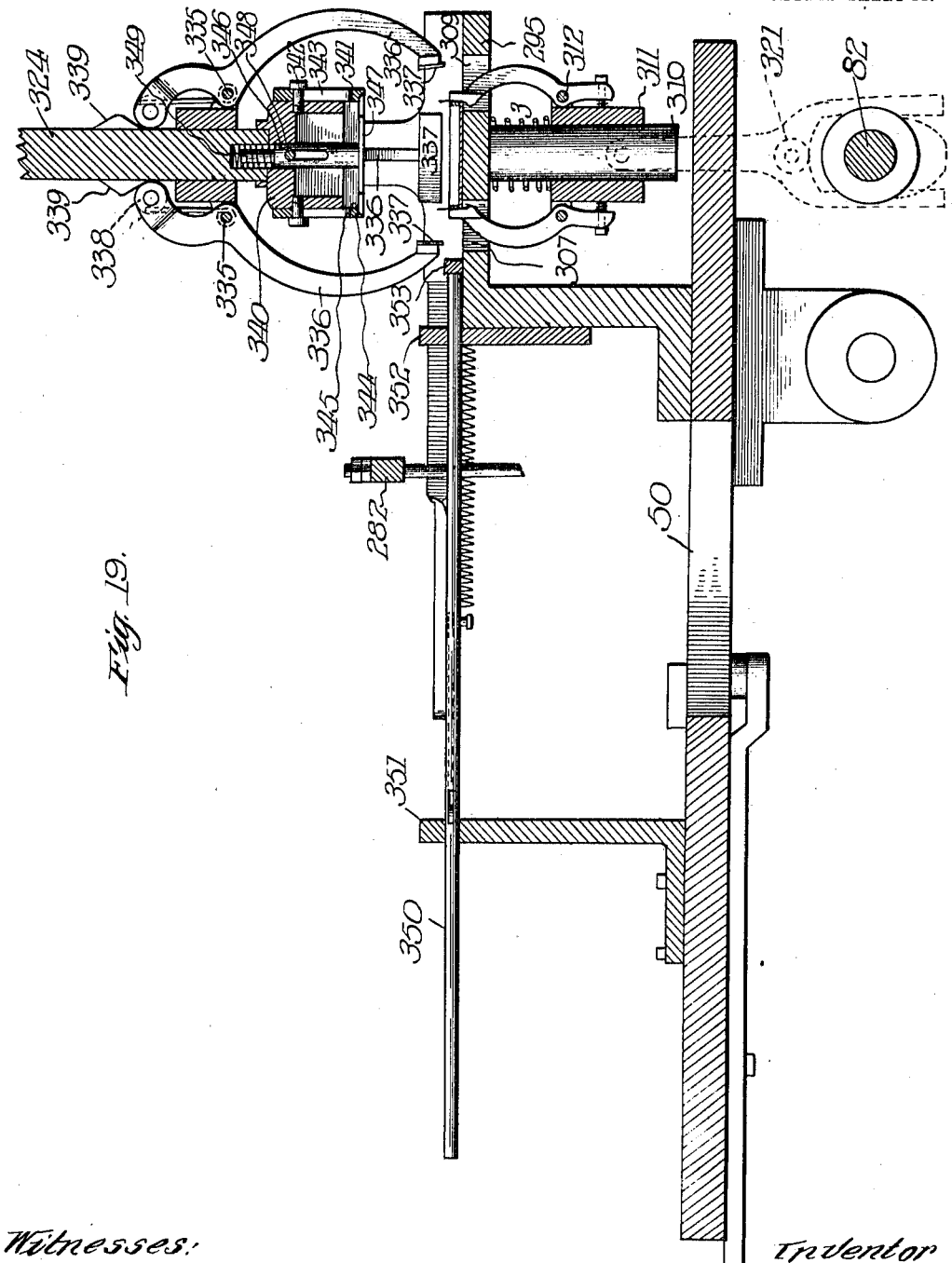
Witnesses:
Inventor
Eugene A. Telfair
By Lithicum, Bell & Fuller
Attys.

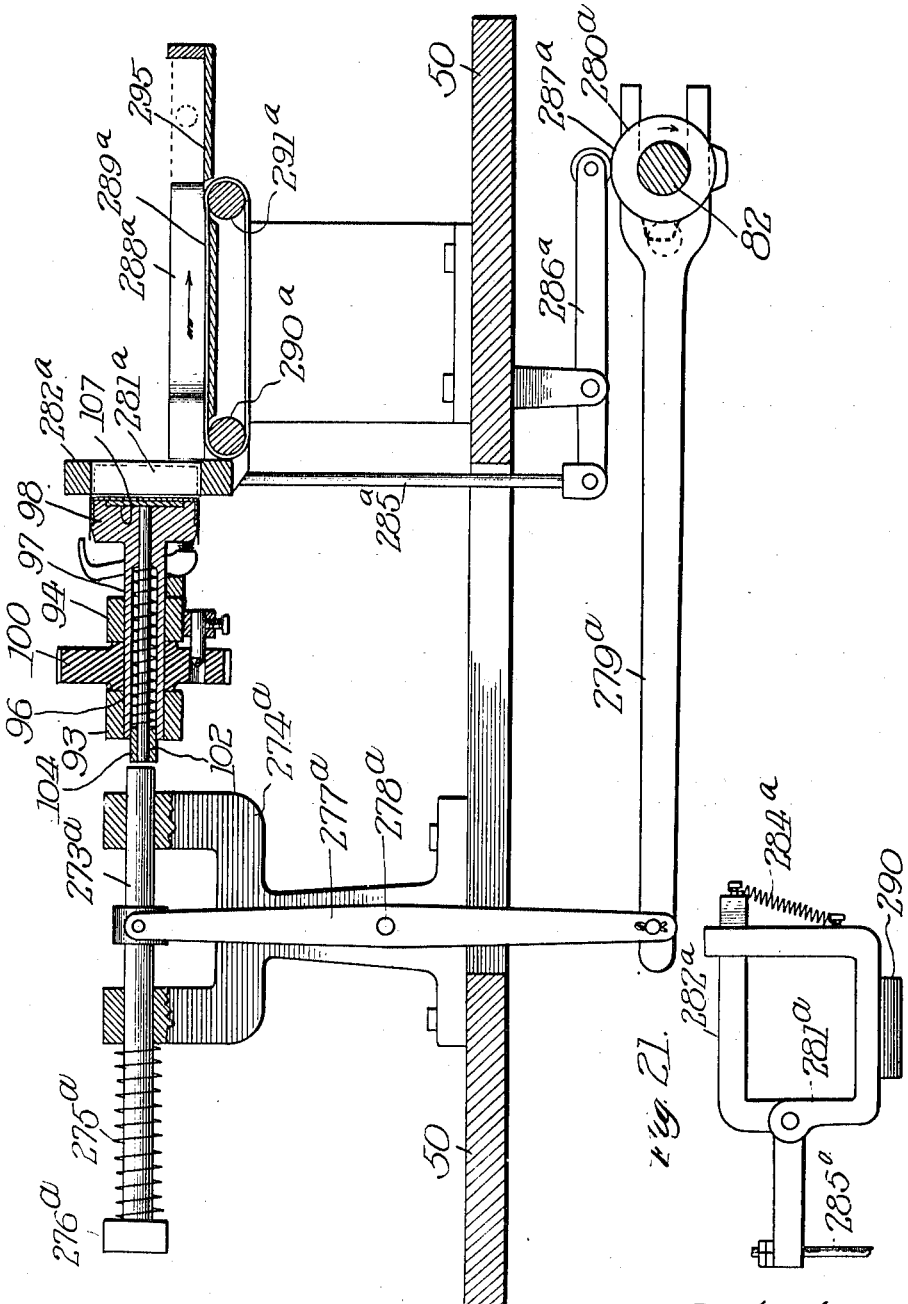

E. A. TELFAIR.
PASTEBOARD BOX MACHINE.
APPLICATION FILED MAR. 7, 1910.
1,054,473.
Patented Feb. 25, 1913.
16 SHEETS—SHEET 13.
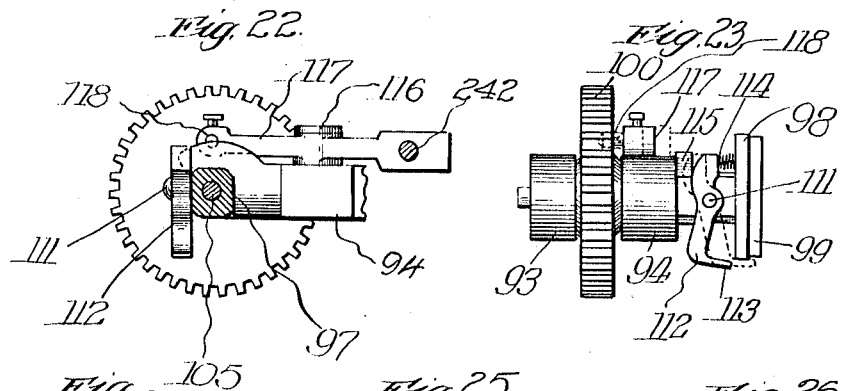
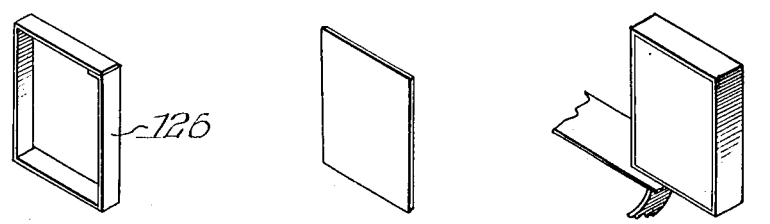
Witnesses
Inventor
Eugene A. Telfair
By Linthicum Belt & Fuller
Atty

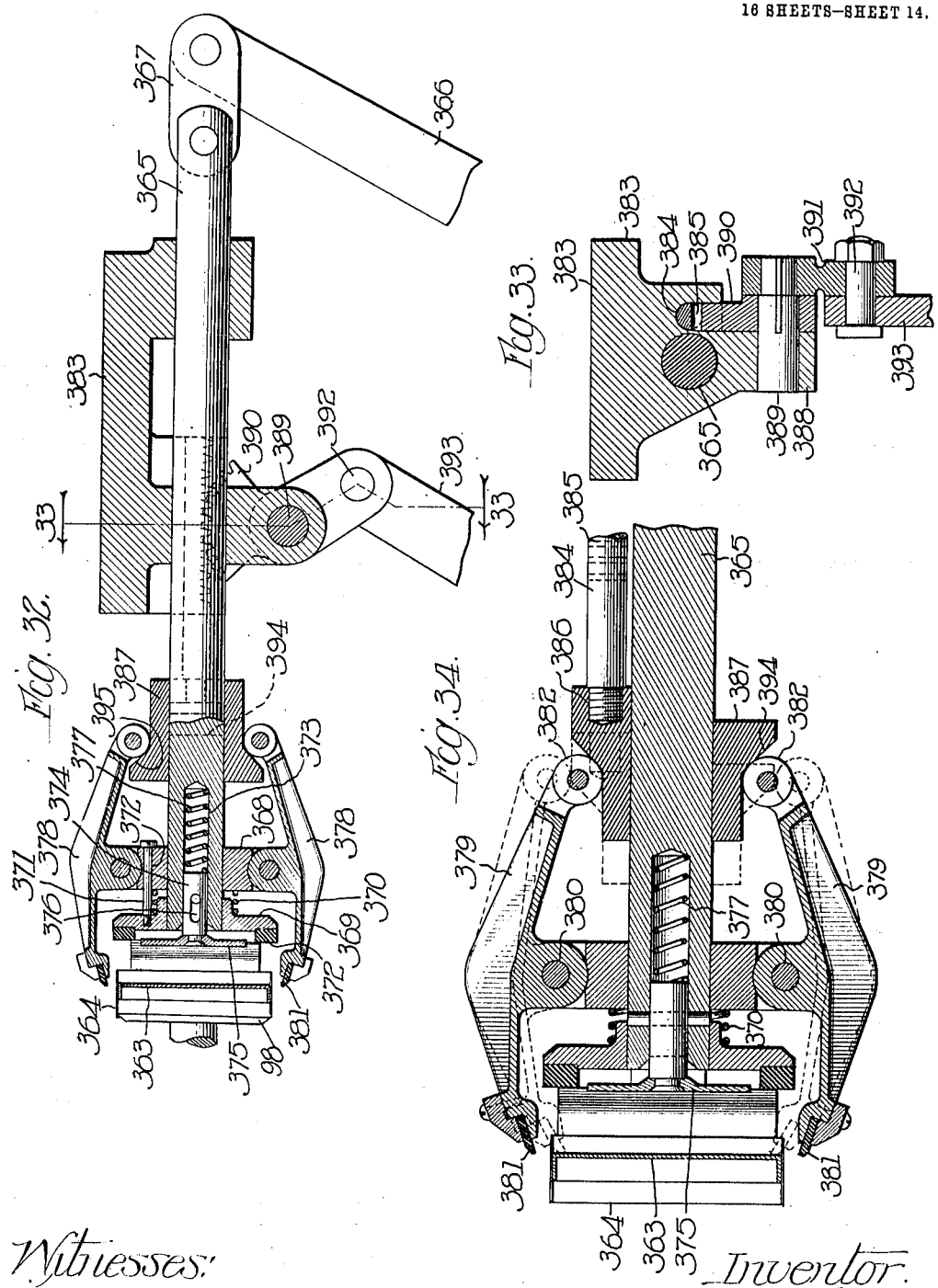

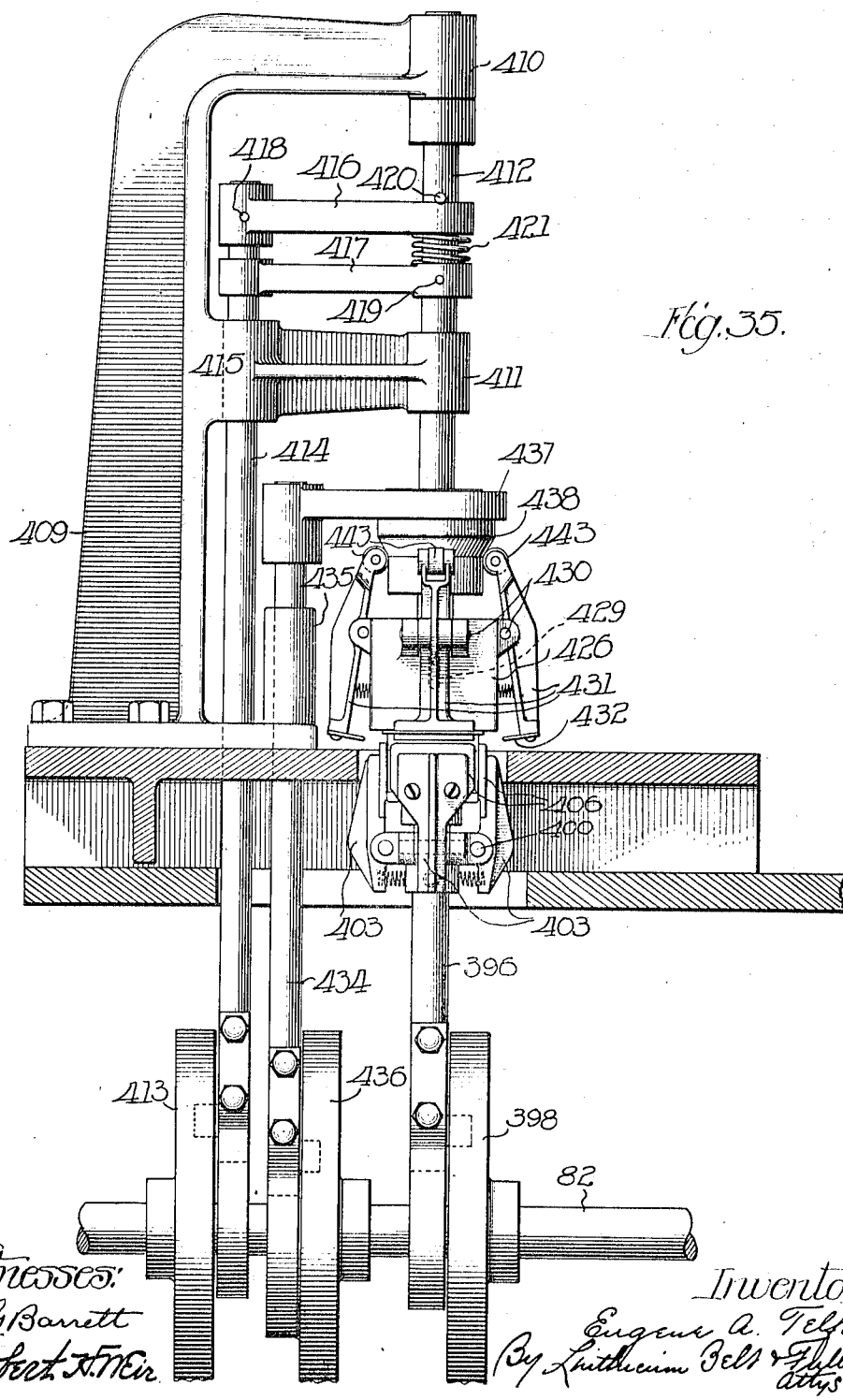

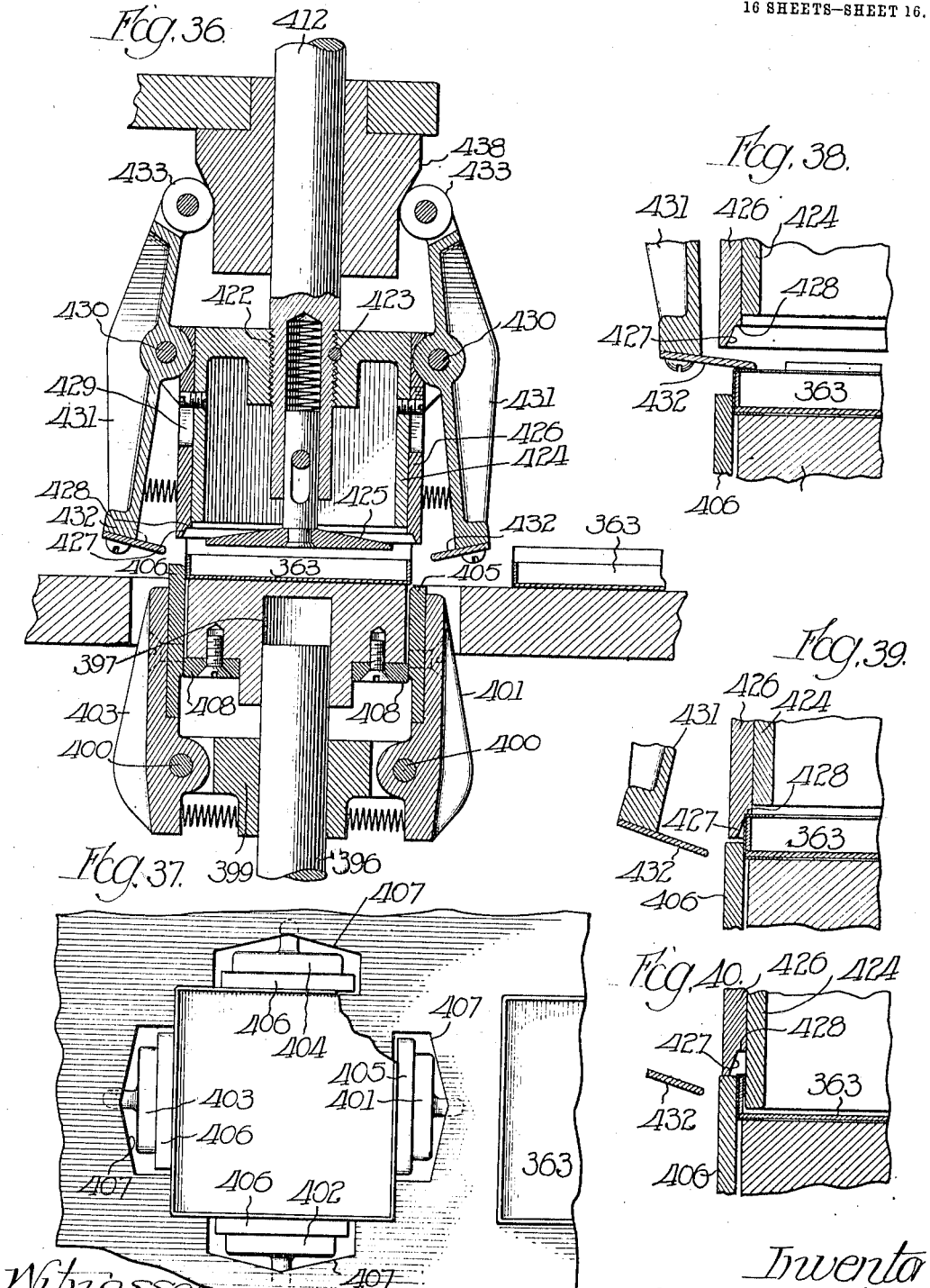
E. A. TELFAIR.
PASTEBOARD BOX MACHINE.
APPLICATION FILED MAR. 7, 1910.
1,054,473.
Patented Feb. 25, 1913.
16 SHEETS—SHEET 16.

UNITED STATES PATENT OFFICE.

EUGENE A. TELFAIR, OF BATAVIA, NEW YORK, ASSIGNOR TO W. C. RITCHIE & COMPANY, OF CHICAGO, ILLINOIS, A CORPORATION OF ILLINOIS.

PASTEBOARD-BOX MACHINE.

1,054,473.

Specification of Letters Patent.

Patented Feb. 25, 1913.

Application filed March 7, 1910. Serial No. 547,676.

To all whom it may concern:

Be it known that I, EUGENE A. TELFAIR, a citizen of the United States, residing at Batavia, in the county of Genesee, State of New York, have invented certain new and useful Improvements in Pasteboard-Box Machines, of which the following is a specification.

This invention pertains to machines used in the manufacture of pasteboard boxes, and relates more particularly or more especially to an appliance of this character for securing the heads in the rims or bodies of the boxes and covering the latter with paper, the two edges of which are folded into the box and over the head, respectively.

One of the main and leading objects of the invention is the production of a machine of this character which will assemble the parts of a box with great rapidity so that the boxes can be produced at high speed and with a maximum of economy.

The invention is particularly useful in the manufacture of rectangular or similar boxes having the sides or rims disposed at an angle one to the other as distinguished from machines of this kind used for the production of round pill boxes, but it will be readily understood from the following detailed description of this machine that the same is also adapted, with slight modification, for the production of the round boxes referred to.

In order that a full and complete understanding of the invention may be had, I have illustrated a preferred and desirable embodiment thereof in the accompanying drawings, throughout the various views of which like reference characters refer to the same parts.

In these drawings—Figure 1 is a fragmentary end elevation of a machine embodying this invention; Fig. 2 is a plan view of the machine; Fig. 3 is a fragmentary rear elevation of the machine; Fig. 4 is a fragmentary front elevation of the machine with many parts omitted; Fig. 5 is a vertical section through the machine showing the means for applying the bodies or rims to the form and illustrating the manner of wiping the glued paper down on to the head or bottom of the box; Fig. 6 is a perspective view of one of the rods carrying the cams for operating the wipers shown in Fig. 5; Fig. 7 is a face view of one of the operating cams; Fig. 8 is a cross-section on line 8—8 of Fig. 5 with the parts viewed in the direction indicated by the arrows; Fig. 9 is a vertical section through the machine adjacent to the form carrier; Fig. 10 is a perspective view of one of the box forms; Fig. 11 is a vertical section through that portion of the mechanism which feeds and applies the heads to the boxes; Fig. 12 is a partial plan and partial section of the mechanism shown in Fig. 11; Fig. 13 is a view similar to Fig. 11 and illustrates the manner in which the blank heads are received in their carrier, and illustrates more in detail the operating mechanism for this portion of the machine; Fig. 14 is a section on line 14—14 of Fig. 13, the parts being viewed in the direction indicated by the arrows; Fig. 15 is a section through the paper band feeding and applying mechanism; Fig. 16 is a section adjacent to the section of Fig. 15 illustrating the cam construction more fully; Fig. 17 is a fragmentary longitudinal vertical section through that portion of the machine for folding into the top of the box the upstanding portion of the glued paper; Fig. 18 is a fragmentary plan of the mechanism shown in Fig. 17; Fig. 19 is a vertical section of the same parts as are shown in Fig. 17, the section being at right angles to that of Fig. 17; Fig. 20 is a vertical section through that portion of the machine in which the partially completed box is ejected from the form; Fig. 21 illustrates the expansible frame which temporarily holds the ejected box; Fig. 22 is a section illustrating the mechanism associated with one of the forms; Fig. 23 is an elevation of the same parts; Fig. 24 shows in perspective one of the rims of the box; Fig. 25 is a perspective of one of the heads; Fig. 26 shows the rim and head combined with the paper ready to be applied for holding the same parts in assembled relation; Fig. 27 shows in perspective the paper applied to the box and overlapping the same; Fig. 28 shows the paper folded down on to and adhering to the outer face of the box head; Fig. 29 is a fragmentary section through such a box with the paper just applied; Fig. 30 is a similar view showing the paper folded over onto the head of the box; Fig. 31 is another similar view showing the other protruding portion of the paper folded down into the box so as to adhere to the inner surface of the box sides;

Fig. 32 is a section through a modified construction for folding the glued paper on to the head of the box and causing it to adhere thereto: Fig. 33 is a cross-section on line 33—33 of Fig. 32; Fig. 34 is an enlarged central horizontal section through the head of the appliance shown in Fig. 32; Fig. 35 is a section showing in elevation a modified form of means for folding the edge of the glued paper into the box; Fig. 36 is a longitudinal section on an enlarged scale through the mechanism shown in Fig. 35; Fig. 37 is a fragmentary plan view of a portion of the construction of Fig. 36; and Figs. 38, 39, and 40 are fragmentary sections illustrating the steps followed in folding the protruding top edge of the glued paper over into the box for causing its adherence to the inner side walls of the box.

Referring to the drawings, it will be noticed that the improved machine includes a table 50 supported by means of four corner legs 51, and on such table is bolted a bearing 52 accommodating a rotary shaft 53, on the outer end of which next to the bearing and held by a suitable collar 54 is a slotted element 55, Figs. 1, 2, and 4, forming one part of a Geneva movement. As is clearly indicated in Fig. 4, this element 55 is of disk form, having four radially-extended slots 56 disposed 90° apart, the periphery of the member or element between the slotted portions being concave at 57 for the accommodation of the convex or curved part 58 of the other element 59 of the Geneva movement fixed to the shaft 60 disposed below and in the same general direction as the shaft 53. This second member 59 has a cut-away portion or concave recess 62, and opposite the same on an extended arm 63 of such member I provide a roller 64 adapted to enter and leave the various slots 56 of the element 55, causing step by step rotation of the shaft 53, each movement being through an arc of 90°. As this form of mechanism is well known, it will be readily understood that the shaft 53 is held or locked in its various positions by the entry of the convex portion 58 of the lower member 59 in one of the concave recesses 57 of the upper member 55. By this means the shaft 53 is rotated step by step through arcs of 90°, although this lower shaft 60 rotates at a constant speed. This shaft 60 is rotatable in suitable bearings 65 and has keyed or otherwise fixed thereto a gear 66 meshing with the teeth of which is an intermediate gear 67 suitably mounted on the table, this latter gear in turn meshing with another characterized 68 and mounted on a short shaft 69 rotatable in bearings 70 bolted to the top of table 50, such shaft 69 also having fixed thereon a slightly larger gear 71, the teeth of which in turn are in mesh with those of another gear 72 rotatably mounted in any approved manner on the under side of the table, it being understood that such table is slotted at 73 for the proper accommodation of the above-mentioned gears and the lower elements of the Geneva movement referred to. Gear 72 meshes with another 74 on an end drive shaft 75 below one end of the table and revoluble in a pair of bearings 76 and 77 bolted or otherwise conveniently fastened to the under side of table 50. As is shown in Fig. 1, this gear 74 is maintained in proper position at the side of the bearing 76 by means of a key 78 coöperating with the hub 79 of the gear whereby to fix the same to the shaft. At its other end this shaft 75 has mounted thereon a bevel gear 80 in mesh with a similar bevel gear 81 on what may be termed a cam shaft 82 extended longitudinally of the table at the back thereof, such shaft being supported and revoluble in a pair of bearings 83, 83 fixed to the under surface of the table, and on the end of such shaft remote from the bevel gear 81 I mount a comparatively large spur gear 84, Figs. 2 and 3, which is in mesh with a pinion 85 on a short main drive shaft 86, the latter having loosely mounted thereon a driving pinion 87 adapted to be rotated from any suitable source of power by means of a belt not illustrated, and in order that such pulley may be brought into operative relation with the shaft 86 I provide the machine with a friction clutch 88 of any approved type, operable by means of a handle 89 protruding from beneath the table at the front of the machine, Fig. 2, and in order that the shaft 86 may if desired be turned manually I affix to its outer end a hand wheel 90 of the usual type.

From the above description it will be apparent to those skilled in this art that the power derived from the pulley 87 is used from the various shafts and gears described to rotate shaft 60 at a constant desired speed, and that the latter in turn occasions the intermittent rotation of the shaft 53.

The inner end of shaft 53 is provided with a carrier 91 in the present instance integral with the shaft 53, though this is not necessary since it is simply required that such carrier be fixed with the shaft to move therewith. Such carrier has four bifurcated arms 92, 92 disposed or arranged 90° apart, the spaced parts 93 and 94 of each of such arms being apertured in alinement at 95 and 96 to accommodate and form bearings for the hollow cylindrical extension or shank 97 which has at one end a rectangular form or block 98 slightly tapered at 99 for the reception and accommodation of the rectangular box rims. Between the spaced portions or parts 93 and 94 of each of these carrier arms 92 the hollow spindle or shaft 97 has fixed thereto a spur gear 100, Figs. 1 and 5. Such gear as described being fixed to the shaft by a set-screw or otherwise, properly maintains the hollow shaft 97 from longitudinal displacement in its bearings. The cylindrical recess 101 in shaft 97 accommodates the coil expansion spring 102 bearing at one end against the end wall 103 of the recess, and abutting at its other end against the inner surface of a sleeve or collar 104 fixed to the end of a rod 105 and conforming in external diameter to the bore of the recess 101. The rod 105, as is indicated, is sufficiently smaller in diameter than the recess 101 to provide sufficient space for the accommodation of the spring 102, such rod extending through an aperture 106 in the box rim form 98 and adjacent portion of the shaft, and carrying at its end a plate pusher 107 normally retracted by the action of spring 102 on the rod 105 into the slight depression or cavity 108 in the face of form 98, Fig. 10. As is clearly illustrated, the shape of this plate pusher is of cross conformation and the cavity or recess 108 is of substantially the same size and shape. In order to prevent this pusher from turning relatively to the form 98, rod 105 is equipped with a lengthwise groove 109 into which projects the inner end of a screw 110 fitted in the threaded hole of shaft 97. On that portion of the shaft 97 between the arm 94 and the rim form 98, I pivot on a screw 111 threaded into the shaft a clamp 112 (Figs. 5, 9, 12, 22 and 23) having a finger or end 113 adapted, under certain conditions, to overlap or engage the edge of the rim form as shown in dotted lines in Fig. 23, this clamp being pressed to such disk by means of a coil expansion spring 114 interposed between its other end and the adjacent face of rim form 98. The clamp is held in inoperative position as shown in full lines in Fig. 23 by means of an inclined cam 115 secured to the face of the part 94 by means of screws. Also on the arm 94 I pivot at 116 a lock arm 117 carrying at one end a lock pin 118 adapted to be projected into a hole 119 of gear 100, whereby to prevent rotation of said gear and the rim form 98. In order to maintain such lock pin in operative locking engagement with the gear, I interpose between the opposite end of the arms 117 and the carrier 91 an expansion spring 120 which by its action normally presses the pin into locking position with respect to the gear. As I have clearly illustrated, each of the four arms of the intermittently moved form carrier 91 is provided with a mechanism of this kind.

Referring now to that portion of the mechanism for applying the rectangular rims or sides of the pasteboard box to the various forms 98 as they are brought to proper position, it will be observed that a hollow plunger box 121 is mounted in any approved manner on the top of an inverted U-shaped standard 122 bolted to the top of table 50. This plunger box or shell is positioned in alinement with the rim form 98 in its uppermost position, and in which position it is temporarily maintained stationary by the Geneva movement or carrier actuating mechanism 55, 58. Box 121 is hollow, open at both ends, and has each of its inner side faces and its bottom wall provided with two parallel grooves 123. In such box or shell and adapted to slide therein, I employ a plunger or rim pusher 124 of general rectangular form in cross-section and substantially fitting the interior of the hollow box 121. On its two sides and on its bottom this plunger or pusher has ribs 125 adapted to fit and slide in the above-mentioned grooves 123, Fig. 5. Such plunger or pusher 124 is adapted to apply or force the rectangular box rim 126, Figs. 5 and 24, to the tapered portion 99 of the form 98 in alinement therewith, and in order to actuate such plunger or pusher I provide a cam 127 on shaft 82, Fig. 3, and I fulcrum at 128 a cam lever 129, the lower end of which is supplied with a roller 130 traveling on the surface of such cam, the upper end of the lever being connected to the plunger 124 by a link or connecting rod 131. In order that these rectangular pasteboard box rims may be fed in succession to the hollow box or shell 121, I mount on top of the latter and above an opening 134 in the top wall thereof a magazine chute 132 open at the back and front at 133 and adapted to contain the box rims, 126, such rims resting one on top of the other. It will be obvious that this magazine is adapted to feed these rims one after the other through the opening 134 to the box 121, and that the reciprocatory plunger 124 individually places such rims on the forms 98 as the latter are brought to position. As soon as the plunger returns sufficiently to open the passage 134, the rims above by their own weight drop so that another one is received in the box 121 in front of the plunger. To assist in this feed of the rims and to aid in maintaining them in rectangular form or shape, I supply the top of the box 121 with a pair of bearings 135 in which a shaft 136 may oscillate, Figs. 2 and 3, such shaft being equipped between the bearings with an arm or finger 137 fixed thereto and having its forward end projecting through the opening 133 of the magazine chute into the interior thereof, whereby such arm is enabled to engage the rims, assist in their downward travel, and aid in presenting them to the box 121 in rectangular form. In order to actuate this finger in proper timed relation to the movements of the plunger 124, I mount a downwardly-extended arm 138 on the protruding end of shaft 136, the lower end of such arm being apertured at 139 and having extended through such hole a bent rod 140 connected at the back end of the machine at 141 with a pivot pin between the rock arm 129 and the link or connecting rod 131. At one side of the arm 138 and adjacent thereto rod 140 has thereon a collar 142, Fig. 2, and between the opposite sides of arm 138 and an abutment 143 at the end of rod 140 I employ a coil expansion spring 144 encircling the rod and adapted to bear at its opposite ends against the parts 138 and 143. To return plunger 124 and to maintain the cam roller 130 in contact with its cam 127 I use a coil contractile spring 145 in the box or shell 121, Fig. 5, fastened at one end to the plunger 124 and at its opposite end to a pin or other suitable part 146 rigid with the box or casing. From an understanding of the construction of this portion of the mechanism it will be apparent that assuming that the box rims are supplied by hand, or in any other manner, to the magazine chute 132, the plunger will be reciprocated by its cam and connecting mechanism so as to force the rims one at a time on the various rectangular forms 98 which are brought in succession in front of the open end of the box or casing 121 and temporarily held in such position for the application of these rims, due to the intermittent action of the rotary from carrier. When the plunger is retracted the next rim above falls by its own weight, or by the assistance of the action of the spring-pressed arm 137 if such becomes necessary, into the box in front of the plunger, the other rims also descending and resting upon this lower rim. The spring operated arm 137 assists in this downward travel of the rim, as explained, and also facilitates maintaining such rims in the desired rectangular form. If these rims have a tendency to bulge at the sides or bottom of the plunger box 121, they will nevertheless be forced into rectangular shape before application to the form 98 by reason of the inclined faces 121ᵃ on the inside of box 121, the box being larger some distance inwardly from its mouth than directly at its mouth, so that the rims by traveling along the same are readily caused to assume proper rectangular or other form. If bulging of the rims occurs satisfactory discharge of the same from the box 121 will occur due to the presence of the protruding ribs 125 of the plunger, and attention might be directed to the fact that the plunger is of slightly less height than the opening in its containing box, so that if the top strip of the rim therein is concave or bent downwardly with the rim above resting in such depression, such upper rim will not be fed forward or damaged as the plunger advances. After the rim has been applied to the form as described above, in the uppermost position of such form, the carrier by the mechanism referred to is rotated 90° so as to bring such form with the rim thereon in position for the application of the pasteboard ends or heads; that is, these rectangular pieces, which will be referred to hereinafter as tops, bottoms, or heads, are inserted slightly within the rims ready for the application of the covering paper which holds such tops or bottoms in the rims and gives the finished box a pleasing and attractive appearance. On the table 50 a standard or upright support 147 is bolted and is supplied with a horizontal bearing 148, Figs. 11 and 13, which receives a hollow sliding cylindrical sleeve 149 preventing this turning relatively to the standard by means of a set-screw 150, Fig. 12, extended through the bearing into a key-way or groove 151 in the sleeve. At its forward end such sleeve is equipped with a box or shell 152 having a rectangular cavity 153 open at the end toward the form carrier. Sleeve 149 accommodates in its axial bore 154 a cylindrical rod 155 carrying at one end a rectangular pusher or plunger 156 in the cavity 153 of the shell or box 152. This plunger or pusher is reciprocated by means of a cam 157 on shaft 82, such cam having a cam slot 158 in one face in which travels a roller 159 secured to a link 160 having a forked end 161 straddling the shaft and pivoted at 162 at its other end to the lower arm of a lever 163 fulcrumed on the bracket at 164, such lever at its top end having a pin and slot connection at 165 with the rod, and in order to interpose a cushion between such lever and rod I house in a cavity of the latter a coil expansion spring 166 pressing outwardly a small plunger 167 which bears against such lever, this construction being clearly shown and illustrated in Fig. 13. Owing to this cushion or spring connection between the parts the elements are enabled to readily adapt themselves to variations in the thickness of the pasteboard stock employed. The top wall of the box or shell 152 has a slot 168 therein, and above the same a flaring chute or guide 169 is positioned. The slot 168 is adapted to be opened and closed by means of a sliding plate 170 on the forward end of a sliding rod 171 reciprocatory in a suitable bearing 172 on the standard 147, such rod and plate being pressed forwardly into slot closing position by an expansion spring 173 positioned between the end of the rod and the standard. The bottom side of plate 170 is equipped with a pin 174 with which the plunger or pusher 156 is adapted to coöperate to open the slot 168 at the proper time, whereby to permit the entrance of a waiting pasteboard top or bottom to the cavity or recess 153 in the box or shell 152.

On the top of standard 147 I mount a magazine chute 175 adapted to contain a supply of stock of the pasteboard tops or bottoms 176, and in order to insure their proper descent a weight 177 may be placed thereon if found desirable or necessary. A sliding discharge plate 178 is used at the bottom of this magazine and is intended in its reciprocatory movements to discharge these pasteboard tops or bottoms one at a time into the guiding chute 169. The proper movements of the part 178 are brought about by means of a lever 179 whose top end extends upwardly through an opening or slot in the discharger, such lever 179 being fulcrumed at 180, Fig. 3, and having its lower end rocked by a cam 181 on shaft 82 and a coöperating arm 182, such parts being similar in construction to the parts 157 and 160.

During the application of the binding covering paper it is necessary that the plunger 156 shall rotate with the form 98, and to permit such rotation the connection of the plunger with the rod 155 is made in the following manner:—The plunger is provided with a hollow hub 183 fitted over a reduced end 184 of the rod 155, these parts being of cylindrical form so as to permit rotation of the plunger relatively to the rod. In order to prevent displacement of the head from the rod, this reduced end 184 is equipped with an annular groove 185 into which the end of a pin 186 extended through the plunger rod fits, thereby permitting rotation of the head or plunger on the rod, but preventing their separation. It is necessary also that this plunger shall be properly guided in its movements so as to effectively introduce the pasteboard top or bottom into the pasteboard rim on the form, and to effect this result I make the box or shell 152 capable of sliding and employ suitable mechanism for effecting or bringing about this reciprocation. This mechanism includes an enlargement or collar 187 on the end of sleeve 149 remote from the box or shell 152, such enlargement or collar having a lug or projection 188 with which a latch 189 is adapted to coöperate to secure the forward sliding movement of the box or shell 152, its return movement being brought about by means of an expansion spring 190 interposed between the end of bearing 148 and the part 187. The latch 189 is conveniently pivoted on a pin 191 extended laterally from the bifurcated end of rod 155 which receives the upper end of lever 163. This latch 189 has a forwardly-extended beveled or cam portion 192 adapted to coöperate with a pin 193 extended outwardly from the side of bearing 148. Consequently, as the top portion of lever 163 swings forwardly, latch 189 strikes against the lug 188 and compels forward travel of the shell or box 152, and after such latter part has performed its function of guiding the plunger 156 to the form, the latch 189 is lifted by co-action of the parts 192 and 193 and the box quickly returns, due to the expansion of spring 190. Leaving this part of the mechanism temporarily in order to secure a complete understanding of the means for feeding and applying the paper or other covering strip supplied with suitable adhesive, reference may be made particularly to Figs. 1, 2, 3, and 15. On the table 50 there is bolted or otherwise conveniently fastened a support 194 having a cross-web or connecting portion 195 and being supplied on its top with an undercut guide-way 196 having reciprocable therein a slide 197 slotted longitudinally on its top surface at 198 for the accommodation of a strip of glued paper 199 illustrated in dotted lines in Figs. 2 and 15. Such strip of paper is unrolled from a reel (not shown) and passes from the latter over suitable mechanism, which need not here be described in detail, for the application of the adhesive thereto. Pivoted in a pair of standards 202 on the top of slide 197 I provide a clip 203 spring-pressed downwardly by a torsion spring 204 so as to grip or engage the strip of paper in the slot 198. At its front end this slide 197 has an extension 205, bearing against which is a spring arm 206 beneath which the strip of paper is adapted to pass. In order to reciprocate this slide 197 in proper timed relation to the other parts of the mechanism, I provide on shaft 75 a slotted cam 207, coöperating with the slot of which is a roller on a bifurcated member 208 straddling the shaft, one end of such member being pivotally connected at 209 to the lower arm of a lever 210 fulcrumed on the frame or table of the machine at 211 and connected to the outer end of slide 197 by a suitable link 212. In order that the various lengths of the glued paper strips may be severed or cut off at the proper time, I provide at this portion of the machine a knife carrying frame 213 having two arms pivoted at 214 on opposite sides of the standard 194. The free portion of this frame carries a pivoted or rocking knife holder 215 supplied with a cutting blade 216 and an arm 217 normally pressed against an adjustable stop 218 by an expansion spring 219 abutting at one end against the arm 217 and at its other end against a portion 220 of the rocking knife frame. The standard 194 has affixed thereto the other or companion element 221 with which the blade 216 coöperates to effect the cutting or shearing operation. The knife frame 213 has attached thereto a contractile coil spring 222 also secured to the table and acting when the knife is free to pull the same downwardly to carry out the cutting operation. The movements of the frame 213 and the knife carried thereby are controlled by a cam 223 fixed to the shaft 75 and having coöperating with its irregular surface or periphery a roller 224 on an arm 225 suitably pivoted or fulcrumed at 226 beneath the table and connected at its free end by a link 227 to an arm or extension 228 fixed or rigid with the knife frame 213. As will be readily understood, this cam compels the upward movement of knife 216 and at the proper time permits its descent, due to its own weight assisted by the spring 222, whereby to cause the severance of the glued paper strip into parts of proper length.

In a device of this kind it is necessary, or at least desirable, to bring about pressure on the strip of paper as it is applied to the revolving portion of the pasteboard box, whereby to effect an efficient union or securing of the paper strip to the pasteboard rim forming part of the box. In the present embodiment of this invention I employ such a wiping or pressure finger 229 fulcrumed on the standard 194 at 230, the other arm 231 of such lever being apertured and having extended therethrough a rod 232 movable by means of a lever 233 suitably fulcrumed at 234, and carrying at one end a roller 235 riding on the surface of a cam 236 mounted on the shaft 75. The rod 232 has a collar 237 adapted to bear against the lower side of the arm 231, such rod carrying on its upper portion a spring-pressed collar 238 forced downwardly by a spring 239 on to the top surface of the arm 231, it being understood that such arm and the finger 229 form a single lever. By this means a positive retraction of the arm 229 may be secured away from the box on the form while the spring connection between the rod 232 and the arm 229 permits the latter to follow the irregular contour of the rectangular or other shaped box on the rotary form. In order to maintain the roller 235 always in proper contact with its coöperating cam 236, I fasten to the lower end of the rod 232 a contractile spring 240, the upper end of which is connected to a rigid arm 241 secured to standard 194.

After the top, bottom, or head of the box has been applied to the rim on the form 98 by means of the parts 152 or 156 it is desirable to unlock the gear 100 of that particular form, and in order to bring about this result I slidingly mount on the standard 122 a release rod 242, Fig. 2, normally retracted out of the path of travel of the lock arms 117 by an encircling expansion spring 243 pressing at one end against a collar 244 fixed to the rod, and pressing at the other end against one of the bearings 245. The rear bifurcated end of this rod has pivoted thereto the upper end of a bent lever 246 fulcrumed at 247 and carrying at its lower end a roller 248 riding on the exterior cam portion 249 of the grooved cam 181.

The rotation of the form and the parts of the box thereon for the application of the glued paper strip is accomplished by means of the following instrumentalities: A pinion 250 meshes with the teeth of gear 68 and also with those of a gear 251 on a segment shaft 252 rotatable in a pair of bearings 253, 253 bolted to the top of the table, such shaft carrying at one end a gear segment 254 adapted during its rotation to coöperate with the gear 100 in that position of the carrier wherein the glued paper is applied. By means of the gears 68, 250, and 251 the rotation of shaft 69 causes a constant and steady rotation of the segment 254, and the action of the latter while it is in mesh with the corresponding gear 100 operates to rotate the form carrying the parts of the pasteboard box through one complete revolution. The operation of this part of the mechanism occurs substantially as follows: When one of the forms 98 with a rim applied thereto comes opposite the box or shell 152, the latter and its internal plunger 156 are advanced, thereby carrying one of the pasteboard tops or bottoms against the form and slightly into the pasteboard rim thereon, the box or shell 152 quickly retracting while the plunger 156 and its rod 155 remain advanced, acting as a clamp to hold the rectangular pasteboard top or bottom to the form. At just about this time the sliding release rod 242 is pushed inwardly by its cam, rocking the arm 117 and unlocking the gear 100 and the form associated therewith. At the same time that this release of the gear occurs the segment 254 comes into mesh with such gear and the rotation of the latter, the form, and the plunger 156 occurs. Just prior to the beginning of the rotation of the gear 100 and the rim form the glued paper 199 which has been previously advanced is securely grasped between the clamp 112 and the box, the tail of the arm 112 passing off of the incline 115 just as soon as the rotation of the form begins, and in this way the glued paper is caused to adhere to the box, and as the box rotates the paper is wound around the same, being rubbed into secure adherence thereto by the action of the spring actuated pressing or rubbing arm 229, which, because of its peculiar mounting, is permitted to follow the irregular contour or outer surface of the box. While the rim is thus turning and the paper being applied thereto, the slide 197 and the paper clamp 203 are receding ready for the advancement of a new portion of the glued paper, which it will be understood is fed forwardly with the glued side upward. After a proper amount of the paper has been applied to the box the cutter 216 severs the same and then the carrier moves the partially completed box into its next temporary stationary position for the folding over of the edge portions of the glued strip, and to permit such turning of the carrier and the form the arm 229 is rocked on its fulcrum by its cam so as to move out of the path of the form and rim, and during such travel of the carrier the slide 197 and clamp 203 are advanced toward the carrier, carrying with them the glued paper, the forward protruding end of which it will be understood is held beneath the spring 206 ready for application to and pressure upon the outer surface of the box.

After the glued paper has been applied to the outer surface of the pasteboard rim, such paper projects beyond both edges of the rim, as shown in Figs. 27 and 29, and it is necessary to fold such protruding portion of the paper over the bottom or top of the box, and this is accomplished while the box parts are on the form while the latter is in its lowermost position of travel.

On a depressed portion 255 of the table 50 between the legs of the standard 122, Fig. 5, I mount a bearing 256 for the accommodation of a sliding sleeve 257 reciprocable in said bearing but prevented from rotation therein by means of a screw 258 engaging the slot 259 in the sleeve. This sleeve carries a head 260 at its inner end provided with four pairs of protruding bearings 261 disposed 90° apart around the head and accommodating the fulcrum or pivot pins 262 on which the four wiper arms 263 are rockingly mounted. The top and bottom arms I have characterized 264, 264 and these are somewhat shorter than the two side arms 265. All of such arms at their free ends carry pressers or rubbers 266 made of any suitable material such as rubber or the like, the two top rubbers being of substantially the same length as the width of the box, while the two side rubbers are of greater length, being substantially the same as the length of the box. The sleeve 257 is axially apertured and accommodates a sliding cylindrical rod or shaft 267, the latter having mounted on its inner end a head 268 carrying a spring-pressed plate 270 normally pressed outwardly away from the head a slight distance by means of suitable coil expansion springs 269. Plate 270 is surrounded by a rubber or other suitable pliable rectangular body 268$^a$ on the outer portion of head 268. On its top and bottom the rod 267 is equipped with two cam projections 271—271, and is also supplied on its sides with a pair of similar projections 272, all of which are received within the four longitudinal slots 273, 274, 275 and 276 of the sleeve 257. As is clearly illustrated, particularly in Fig. 5, the two cam projections 271 are adapted to operate the top and bottom rubbers 266, the two side cam projections 272 being provided for the purpose of actuating the pair of side rubbers 266. The rod 267 is actuated or reciprocated by means of a lever 277 suitably fulcrumed at 279 in a bracket 278 mounted on the frame of the machine, the lower end of such lever 277 being pivoted at 280 to the end of a bifurcated element 281 straddling the shaft 82 and carrying an anti-friction roller 282 traveling on the irregular periphery of a cam 283 fixed to such shaft, such element 281 being pulled toward the shaft by a suitable coil spring 284, whereby the roller 282 is always maintained in proper contact with the cam. Sleeve 257 is reciprocated by means of a lever 285 fulcrumed on a suitable bracket at 286 and pivoted at its upper end at 287 to the sleeve, the lower end of such lever being pivoted at 288 to a member 289 bifurcated as indicated to straddle the shaft 82, and carrying a roller 290 adapted to travel in the slot of a cam 291 rigidly fixed to and rotatable with shaft 82. The operation of this portion of the appliance is practically as follows: After the form has been brought to its lowermost position and temporarily maintained in such position by the intermittently rotatable carrier 91, the two cams 283 and 291 operate to advance the shaft or rod with its head and sleeve with its wiping fingers toward the box on the form, such box at this time having the glued paper protruding or extending beyond both edges of its rim. These parts travel forwardly sufficiently to cause the side rubbers 266 to overlap the box on the form, the other rubbers coming substantially flush with the outer face of the box top or bottom. The sleeve then ceases its inward travel, but the inner rod or shaft continues its inward movement, and by so doing advances its top and bottom cam projections 271 so as to rock the top and bottom rubber or wiper fingers 264 on their fulcrums 262, thereby wrapping or folding the top and bottom portions of the protruding glued paper over and on to the outer surface of the pasteboard top or bottom, and when these fingers reach the limit of their inward travel toward the axis of the sleeve, the sleeve retracts slightly so as to permit the rollers of the arms 264 to travel down the back slopes or surfaces of the projections 271, and while they do this the top and bottom rubbers expand, as will be readily understood, but, owing to the fact that the sleeve has retracted slightly, this opening or expansion of these top and bottom rubbers to their original outward position is accomplished without the rubbers contacting with the paper which they just previously rubbed down on the pasteboard, thereby eliminating all possibility of again rubbing up or dislodging such paper. The cam controlling the movement of this sleeve is so cut or made that this retraction of the sleeve ceases just as the side rubbers come to proper position for effecting or securing the inward folding or bending of the side strands or portions of the outstanding glued paper. The internal rod or sleeve continues its inward movement and brings the side cam projections 272 into coöperation with the arm 265 of the side rubbers, causing their inward travel toward the axis of the sleeve and efficiently effecting the rubbing down of these side glued strips, at the same time forming neat miter folds in the paper at the corners of the box, as shown in Fig. 28. The sleeve again further retracts, thereby permitting the rollers of the side rubber arms 265 to roll down the back surfaces of the projections 272, which results in the expansion or opening up of such rubbers while backed away from the box, this operation being similar to that which occurred in connection or relation with the top and bottom rubbers. The inner rod or shaft now continues its forward movement toward the box on the form and brings the pressure plate 270 against the head of the box, and also brings the rubber of other pliable marginal portion 268$^a$ of the head into pressing contact with those portions of the glued paper which have been folded down as described above, thereby obtaining an effective engagement between such parts of the paper and the face of the top or bottom of the box. In order to prevent this pliable material from drawing the box off of its supporting form, the pressure plate 270 is employed, which as the shaft 267 backs away is projected outwardly by its springs 269 beyond the face of the pliable material 268$^a$, thereby obtaining the proper separation of such material from the box without dislodging the latter from its form, the subsequent separation of the plate 270 from the central portion of the box having no such tendency, since such plate does not contact with any glued parts. The inner rod or shaft continues its backward travel and as it does so its four cam projections 271 and 272 travel under their corresponding rollers of the rocking spring-pressed rubber arms, and such arms again move inwardly toward the axis of the sleeve, but inasmuch as their rubbers are backed away sufficiently from the box this movement of the rubbers accomplishes no useful result except to permit the parts to assume their normal original position.

Referring now to the operation which takes place in the fourth or last position into which the carrier brings the box, it will be observed that I slidingly mount an ejector rod 273$^a$, Figs. 2 and 20, in standard 274$^a$ fastened to the top of table 50, such rod being retracted by a coil spring 275$^a$ interposed between the head 276$^a$ on the end of the rod and one end of the standard. This rod or sliding shaft is in such position as to be in alinement with the sliding rod 102 of one of the carrier forms, and the rod 273$^a$ is intended to be actuated by a lever 277$^a$ fulcrumed on the standard at 278$^a$ and connected at its lower end to a cam arm 279$^a$, the movements of which are governed by a suitable cam 280$^a$ on shaft 82. In front of the rotary box form in this fourth position I provide a frame 281$^a$ of substantially the size of the box and having a top arm or section 282$^a$, Figs. 2, 3, 17 and 20 pivoted at 283$^a$ and normally pulled downwardly by a coil spring 284$^a$ against a suitable stop, the other end of such lever 282$^a$ being connected by a link 285$^a$ to a lower lever 286$^a$, the rocking of which is controlled by a cam 287$^a$ on shaft 82 adjacent to one of the bearings 83. Just back of this frame 281$^a$ and between a pair of guides 288$^a$, Figs. 2 and 20, I employ an endless belt 289$^a$ adapted to convey the box away from the frame 281$^a$ to another part of the appliance. As is indicated in the drawings, this belt travels over two shafts or drums 290$^a$ and 291$^a$, the latter of which is equipped with a grooved pulley 292, taking around which is a small crossed belt 293 which also encircles a larger grooved driving pulley 294 fixed to shaft 82. This endless flat belt 289$^a$ is on an upper or auxiliary table 295, and sliding on the latter at the rear end of belt 289$^a$ is a pusher 296, Fig. 2, on the end of a long rod 297 slidable in suitable bearings 298, 298, and connected adjacent to its rear end to one arm of a bell crank lever 299 fulcrumed on a bracket at 300, the other arm 301 of such bell-crank lever having pivoted thereto a bifurcated member 302 pulled downwardly by a spring 303 and straddling shaft 82, such member 302 having on one side a roller 304 riding on the surface of an operating cam 305 fixed to the end of the back shaft 82. Adjacent to the end of the stroke or movement of the pusher 296 this supplemental table 295 has four slots therethrough, Fig. 18, characterized 306, 307, 308 and 309, and centrally disposed beneath such apertures is a fixed depending cylindrical stud 310, Figs. 17 and 19, on which slides a sleeve 311 having pivoted thereto 90° apart on pivot or fulcrum pins 312 extended through suitable projecting ears 313 a spring-pressed arm 314 and three other arms 315, the top enlarged ends of which extend through the above-mentioned apertures of the supplemental table. All of these arms with the exception of one characterized 314 are long enough so that in their normal position they extend slightly above the top of the table, as shown in Fig. 17 and act as guides for the partially completed box pushed or moved thereto by the sliding member 296. Inasmuch as it is necessary in this movement of the box for it to travel over the arm 314, the latter is made shorter than the others, as shown for example in Fig. 17. Each of the four arms has an inward projection 316 adapted under the conditions specified hereinafter to apply pressure to the outer faces of the box rim. These arms 314 and 315 are normally rocked on their pivot pins 312 by coil springs 317 which cause the brackets 316 to bear against the inner walls of the apertures 306 to 309, inclusive, as is readily understood. Between the sleeve 311 and the bottom of the table 295 a coil expansion spring 318 is employed to force the sleeve downwardly, and in order to slide the latter upwardly in the proper timed relation with the operation of the other parts, I connect thereto at 319 a bifurcated arm 320 straddling shaft 82 and carrying a roller 321 coacting with a cam 322 on the back shaft 82.
On top of this upper table I mount on a bracket 323 a cylindrical sliding rod 324 reciprocable in a pair of bearings 325 and 326, the movement of such shaft being brought about by means of a top lever 327 pivoted at 328 on the bracket and connected by a link 329 to an upright arm 330 having at its lower end a bifurcated extension 331 spanning shaft 82 and carrying a roller 332 traveling on the surface of an operating or controlling cam 333, such arm 330 being normally pulled downwardly by a contractile spring 334. As is clearly indicated, the bearing 326 has pivoted thereon at 335 a plurality of spring-pressed wiper arms 336 (in the present instance three), the lower end of each of which carries a wiper portion or element 337, the lower edge of which is substantially in the plane of the top of the box rim while the latter rests on table 295.
At their front ends each of these wiper arms 336 carries a roller 338 with which coöperate the cam lugs or projections 339 on the sliding shaft 324, such projections controlling the wiping movement of the arms, as will be readily understood. The lower end of vertical shaft 324 carries a hollow rectangular head 340 reciprocable on which is an external shell 341 held thereto by screws 342 taking into the head and extended through vertical slots 343 in the shell or box. The lower edge of the latter, as is clearly indicated in Fig. 19, is beveled at 344 and has at the inner end of such inclined part a horizontal shoulder 345. Mounted in the head 340 so as to be slidable in relation thereto I employ a slotted shaft 346 carrying at its bottom end a plunger 347 and having extending through its slot a transverse pin 348, limiting the extent of the outward or downward travel of such plunger, the latter being pressed outwardly by a coil spring 349 housed within a cavity in the lower end of shaft 324.

In order to eject or discharge the completed box section from the table 295, I employ a pusher rod 350, Figs. 2 and 19, capable of sliding in its bearings 351 and 352 and having at one end a transverse operating head 353, the rod being actuated at the proper time by means of a lever 354 pivoted on the standard at 355, one end of such lever projecting into a slot in the rod while the other end of the lever is spring pulled toward the rear of the machine by a spring 356. In order to operate this lever whereby to secure the proper movement of the discharge or ejector rod 350, I connect the same by means of a link 357 with the top end of a lever 358 fulcrumed on the frame of the machine at 359 and adapted to be rocked on such fulcrum by a cam 360 on shaft 82, the lever 358, as is usual, being equipped at its lower end with an anti-friction roller 361. At the rear of the machine table 50 is preferably supplied with an inclined discharge plate 362 down which the finished boxes slide into a suitable receptacle, not shown. The operation of this part of the mechanism is practically as follows: Assuming that the rotary carrier 91 has brought the partly completed box section to the fourth stationary position, the ejector rod 273$^a$ is then in alinement with the pin 102 carrying at one end the plate pusher 107, and its cam 280$^a$ then slides the ejector rod 273$^a$ so as to push the partly completed box off of its form 98 into the frame 281$^a$, and to facilitate this if desired the inner surfaces of the frame may be slightly beveled toward the form. Soon afterward the top member 282$^a$ of this frame is lifted against the action of its spring by its cam and the box falls over due to gravity, closed side down, on to the endless belt 289$^a$, which carries it toward the back of the machine. This clamp or frame 281$^a$ acts as a temporary holder for the box so as to receive and steady the same during the advance and back movement of the discharge plate 107, this clamp subsequently opening up as explained whereby to permit the box to fall over on to the belt. As soon as the rearward extension 296$^a$ of the head or pusher 296 permits it, the box is carried by the belt in front of such pusher, which subsequently slides it between the upwardly-protruding ends of the three arms 315 which center the box accurately beneath the head 240 and the shell 241 of shaft 324. During this movement the overhanging edge of the pusher 296 turns over one edge of the paper of the box. The downward travel of shaft 324 rocks the lower ends of the arms 336 inwardly so that their terminal portions 337 fold the adhesive paper inwardly over the other three top edges of the box, and then further descent of the shaft 324 brings the shell 341 downwardly sufficiently so that it rests on the top of the box, the bevel surface 344 assisting in folding in the paper and the shoulder 345 resting on the top edge of the box. The plunger or head 340 continues its downward travel into the box, folding the paper down against the inner surface of the upstanding rim, and in order that complete and adequate adhesion may occur between the glued surface of the paper and the inner face of such rim, cam 322 causes the sleeve 311 to rise against the downward pressure of spring 318 and brings the parts 316 of the four arms 314 and 315 against the outer surface of the rim, thereby securing effective pressure to cause the proper sticking of the paper to the inner side of the rim. Shaft 324 then rises, plunger 347 ejects the box from the shell if there is any tendency for the same to remain therein, the arms 314 and 315 descend, and the discharge rod 350 actuates its head 352 so as to slidingly discharge the completed box from the table 295 on to the sliding discharge plate 362. In this way the completed box section is delivered from the machine.

Although the operations of the various parts of this machine have been indicated above, I deem it advisable to review here briefly the operations of the parts of the appliance which result in the completed box section. This operation takes place in substantially the following manner: When each rim form is brought by the intermittently-movable carrier to its uppermost position it is temporarily maintained stationary at this point and has applied thereto by means of the mechanism and in the manner described above one of the pasteboard rims. The carrier then moves through an arc of 90° and again becomes temporarily stationary, and in this position the form has applied thereto one of the pasteboard heads of the box which is slightly inserted in the above-mentioned rim. The form is unlocked, is caused to make a complete revolution, and during such turning the strip of glued paper is made to adhere to its outer surface, the proper lengths of such paper being automatically cut off and suitable pressure being brought on the form by means of the arm 229 so as to obtain an efficient and even adherence of the paper to the box section. The form is again locked to the carrier and the latter makes another turn through 90° bringing such form and the partially completed box to its lowermost point of travel, in which position the carrier temporarily maintains its stationary. The wiping fingers 263 and 265 operate in succession to fold the glued paper over the outer surface of the head of the box, and subsequently pressure is brought to bear against such head by means of the part 268ª, whereby to obtain the proper application of the folded part of the glued paper to the outer face of the head. Then the carrier moves through another 90° and becomes stationary, the box section is dislodged from the form, is temporarily retained in the frame or clamp 281ª, the latter is automatically opened up permitting the box to fall over on to the endless belt, which carries it into the field of action of the sliding pusher 296, the latter sliding the box against the fingers 315 which properly center it, and then by the mechanism above described that portion of the glued paper projecting above the rim is folded over and down into the box, pressure being applied to the outer face of the rim while the plunger is still in the box to secure the proper contact between the paper and the inner surface of the rim. Then the completed box section is ejected or discharged from the machine by the plunger head 353 during the temporary descent of the parts 315.

In Figs. 32 to 34, inclusive, I have illustrated a modified construction for wiping or folding over the glued paper on to the outer face of the box head or bottom, and in this instance I have characterized the box 363 and its glued paper covering 364, the same being shown in Figs. 32 and 34 as extending beyond the box in the two opposite directions. In this modified construction I employ a sliding rod 365 reciprocated by any suitable mechanism such as a cam (not shown) and connecting levers or arms 366 and 367, and on one end of such rod I fixedly mount a sleeve 368 and a head 369 slidable on the end of the rod and having interposed between itself and the sleeve 368 a coil expansion spring 370, the head being prevented from turning on the rod by means of a screw 371 fitted in a threaded aperture in the head and extended through a hole 372 of the sleeve. The outer face of such head 369 is equipped with a rubber or other yielding rectangular cushion 372 of substantially the same external dimensions as the box, and I slidingly mount in a recess 373 in the same end of the rod the cylindrical stem 374 of a sliding face plate or pusher 375, the stem having a pin and slot connection 376 with the rod and being normally forced outwardly by the coil spring 377. On the sleeve 368 I fulcrum four wiper arms, the two top and bottom ones being characterized 378 and the two side ones being characterized 379, such arms being rockingly mounted on their fulcrum pins 380 and supplied at their forward ends with rubbers or wipers 381 and at their rear ends with rollers 382. In order to cause the proper operation of these wiper arms to effect the folding of the paper over on to the bottom or head of the box, I slidingly mount on the rod 365 a member 383 having secured thereto a rod 384 equipped for a portion of its length on its under side with rack teeth 385, the other end of such rod being screw threaded and fitted in a correspondingly-shaped socket 386 on a cam member 387 slidingly mounted on rod 363. The member 383 has a depending arm 388 carrying a shaft 389, the latter having fixed thereto a gear segment 390, the teeth of which are in mesh with the rack teeth 385, and also having fixed thereto an arm 391 pivoted at 392 to the top end of another arm or lever 393 which may be rocked or actuated in any approved manner, as for instance by a cam not illustrated. The cam member 387 as shown has suitably-inclined or beveled surfaces 394 and 395 coöperating with the rollers 382, it being understood that as the wedge or cam member 387 is slid on the rod 365 the wiper arms 378 and 379 will be oscillated to effect the folding operation described above. In this instance the wiper arms need not be of different lengths since one pair of such arms may be operated and then the other pair operated, due to the proper sliding action of the cam member 387. Otherwise the operation of this mechanism is much like that described above and needs no further description for a full understanding of the same.

In Figs. 35 to 40 I have illustrated a different form of appliance for folding the protruding glued paper down into the inside of the box, and in this case the appliance is provided with a rod 396 having a sliding bearing in the table at 397 and is reciprocated by means of a cam 398 on the shaft 82, such rod having a collar 399 fixed thereto and on which are pivoted at 400 the single arm 401 and the three companion arms 402, 403, and 404, each of such arms carrying at their top ends wear plates, the one secured to the arm 401 being characterized 405 while the three other wear plates are applied with reference characters 406, it being clearly illustrated that the member 405 is slightly shorter than the corresponding parts of the other arms, whereby to permit the passage of the partially finished box over the same. As in the previous instances, the top ends of these arms are located in holes 407 through the table, and the respective wear plates slide on other wear plates 408 screwed or otherwise conveniently fastened to the under side of the table. Above the table and fastened to its top surface I employ a standard or bracket 409 provided with a pair of vertically-alined bearings 410 and 411 in which a rod 412 is vertically slidable, and to effect the proper timed reciprocation of such rod I supply on the shaft 82 a cam 413 operatively associated with a vertical sliding rod 414 reciprocable in another bearing 415 on the bracket, the top end of such rod or shaft 414 carrying two lateral arms 416 and 417, through apertures in the free ends of which the rod 412 passes. As is clearly indicated, arm 416 is fixed by a pin 418 to the rod or shaft 414, and the arm 417 is fixed by a pin 419 to the rod 412, and just above the arm 416 rod 412 is equipped with a pin 420, a coil expansion spring 421 encircling the rod 412 being positioned between the two arms. By this means the rod 412 will be positively raised, due to the co-action of the arm 416 with the pin 420, and will be yieldingly depressed because of the interposition of the spring 421 between the parts. On the lower end of this reciprocating rod 412 I fasten by means of the screw threads 422 and the transverse pin 423 a rectangular hollow plunger 424, and in the lower end of the rod 412 I employ a spring-pressed ejector 425 substantially like that indicated in Fig. 19. Fitted exteriorly of the box 424 I use a rectangular shell 426, being beveled and shouldered on its lower edge at 427 and 428, respectively, such shell having a pin and slot connection 429 with the box or plunger 424. On this outer shell I pivotally mount at 430 four spring-pressed folding arms 431, each carrying at its lower end an inwardly-extended folder 432 and at its top end a roller 433. In order to rock these paper folding arms on their fulcrums I provide a sliding rod 434 in a bearing 435 on the top of the table, and reciprocate such rod by means of a cam 436 on shaft 82, such rod at its upper end having the laterally-extended arm 437 carrying a cylindrical beveled cam or wedge 438 on the surface of which the rollers 433 travel. The operation of this modified construction is shown in particular in Figs. 38 to 40, and takes place substantially as follows: When the box 363 is fed beneath this folding mechanism it is pushed over the arm 401, the other three arms 402, 402 and 404 by means of their wear plates 406 acting as stops and guides to properly position the box. Then due to the action of cam 436 the cylindrical wedge 438 descends, rocking the four arms 431 on their fulcrums and causing their fingers 432 to move inwardly over the box, thereby folding in the extending portion of the glued paper as indicated in Fig. 38. The conical cam 438 then ascends and the spring-pressed wiping fingers 431 expand. Then, due to the action of cam 413, the plunger 424 and its shell 426 descend, the latter resting on the top of the box, and due to its beveled lower edge 427 also assisting in the folding-in operation of the paper. The inner plunger 424 continues its descent into the box, folding the paper downwardly against the inner sides of the rim, as indicated in Fig. 40, and while this plunger is in the box, due to the action of cam 398, the guide and pressure fingers or arms 401, 402, 403, and 404 ascend, their wearing plates 405 and 406 pass off of the wear plates 408 so that these arms with their wear plates apply pressure to the four outer faces of the rim, and in this way cause a secure union between the glued paper inside the box and the inner face of the rim. The arms 401, 402, 403 and 404 descend and slightly expand, owing to their renewed co-action with the plates 408, the plunger 424, shell 426, and the folding-in arms 431 ascend, leaving the box in position ready for delivery from the machine, the plunger 425 as in the previous instances ejecting the box from the shell 426 if there is any tendency for sticking therein.

Having fully described my invention and its various modifications, I wish to state that the invention is not limited and restricted to the precise and exact structural features and details indicated above and illustrated in the drawings, because it is susceptible of a considerable variety of embodiments, and because many minor mechanical changes may be made in the structures herein set forth without departure from the heart and essence of the invention.

I direct attention particularly to the fact that in the machines herein set forth several boxes are being operated upon at the same time, such boxes being in various stages of construction or completion, and because of this arrangement and operation a maximum number of boxes can be produced in a single machine.

I claim:

1. In a machine of the character described, the combination of a rotary carrier, a plurality of rim forms on said carrier, means to automatically intermittently rotate said carrier, means to apply completed box rims to said forms, means to apply box heads to said rims, and means to apply adhesive paper to said rims and heads to fasten the same together, substantially as described.

2. In a machine of the character described, the combination of a movable carrier, a rim form on said carrier, means to apply a completed box rim to said form, means to insert a box head in said rim, and means to apply adhesive paper to said rim and head to fasten the same together, substantially as described.

3. In a machine of the character described, the combination of a movable carrier, a rim form on said carrier, means to apply a completed box rim to said form, means to insert a box head in said rim while on the form, means to apply adhesive paper to said rim and head to fasten the same together, and means to discharge the box from the form, substantially as described.

4. In a machine of the character described, the combination of a movable carrier, a rim form on said carrier, means to apply a completed box rim with flat sides to said form, means to insert a box head in said rim while on the form, and means to apply adhesive paper to said rim and head to fasten the same together, substantially as described.

5. In a machine of the character described, the combination of a movable carrier, a rim form on said carrier, means to apply a completed box rim with flat sides to said form, means to insert a box head in said rim while on the form, means to apply adhesive paper to said rim and head to fasten the same together, and a presser adapted to rub said adhesive paper on the box and to follow the contour of the box, substantially as described.

6. In a machine of the character described, the combination of a movable carrier, a box rim form on said carrier, means to apply a completed box rim with flat sides to said form, means to apply a box head to said rim while on the form, means to rotate said form, rim, and head, means to apply adhesive paper to said rim and head to fasten the same together, and a presser adapted to rub said adhesive paper on the box and follow the contour of the same during its rotation, substantially as described.

7. In a machine of the character described, the combination of an intermittently-movable carrier, a rim form on said carrier, means to apply a completed box rim with flat sides to said form, means to insert a box head in said rim while on the form, means to apply adhesive paper to the rim and head to fasten the same together, and a yielding presser adapted to rub the paper on the box and to follow the contour thereof, substantially as described.

8. In a machine of the character described, the combination of an intermittently-rotatable carrier, means to actuate said carrier, a rim form on said carrier, means to apply a completed box rim with flat sides to said form, means to insert a box head in said rim while on the form, means to apply adhesive paper to said rim and head to fasten the same together, a yielding presser adapted to rub the paper on the box and to follow the contour thereof, and means to discharge the box from the form, substantially as described.

9. In a machine of the character described, the combination of a movable carrier, a rim form on said carrier rotatable about its own axis, means to apply a completed box rim to said form, means to insert a box head in said rim while on the form, means to apply adhesive paper to said rim and head to fasten the same together, and means to rotate said form on its axis during the application of said paper, substantially as described.

10. In a machine of the character described, the combination of an intermittently-movable carrier, a rim form on said carrier and adapted to rotate about its own axis, means to apply a completed box rim with flat sides to said form, means to insert a box head in said rim while on the form, means to apply adhesive paper to said rim and head to fasten the same together, and means to rotate said form, rim, and head around the axis of the form during the application of said paper, substantially as described.

11. In a machine of the character described, the combination of a movable carrier, a rim form on said carrier rotatable about its own axis, means to apply a completed box rim to said form, means to insert a box head in said rim while on the form, means to lock said form against rotation on its own axis, means to actuate said lock whereby the unlock the form, means to apply adhesive paper to said rim and head during the rotation of the form about its axis, and means to rotate said form about its axis during such application of the paper, substantially as described.

12. In a machine of the character described, the combination of a movable carrier, a rim form on said carrier, means to apply a completed box rim to said form, means to insert a box head in said rim while on the form, means to feed and apply adhesive paper to said rim and head to fasten the same together, and means to sever the strip of such adhesive paper into sections of proper length for application to the box, substantially as described.

13. In a machine of the character described, the combination of a movable carrier, a plurality of rim forms on said carrier, means to apply completed box rims to said forms in succession, means to insert box heads in said rims while on the forms substantially simultaneously with the application of other rims to the forms, and means to apply adhesive paper to the rims and heads of the boxes to fasten the same together, substantially as described.

14. In a machine of the character described, the combination of a movable carrier, a plurality of rim forms on said carrier, means to apply completed box rims to said forms, means to insert box heads in said rims while on the forms, and means to apply adhesive paper to the rims and inserted heads to fasten the same together, the application of the rims to the forms, the insertion of the box heads, and the application of the adhesive paper of the plurality of boxes occurring substantially simultaneously, substantially as described.

15. In a machine of the character described, the combination of a movable carrier, a plurality of rim forms on said carrier, means to apply completed box rims to said forms in succession, means to insert box heads in said rims on the forms in succession, means to apply adhesive paper to the combined rims and heads successively to fasten the same together, and means to fold the protruding portion of such adhesive paper over on to the outer face of the box heads, the application of box rims, the insertion of the box heads, the application of the adhesive paper, and the folding of such adhesive paper of the plurality of boxes occurring substantially simultaneously, substantially as described.

16. In a machine of the character described, the combination of a movable carrier, a plurality of rim forms on said carrier, means to apply completed box rims to said forms in succession, means to insert box heads in the rims on the forms in succession, means to apply adhesive paper to the combined rims and heads successively to fasten the same together, and means to fold protruding portions of the adhesive paper into and against the inner faces of the rims, the application of the box rims to the forms, the insertion of the box heads, and the application and folding of the adhesive paper of the plurality of boxes occurring substantially simultaneously, substantially as described.

17. In a machine of the character described, the combination of a movable carrier, a plurality of rim forms on said carrier, means to apply completed box rims to said forms in succession, means to insert box heads in said rims on the forms in succession, means to apply adhesive paper to the combined rims and heads in succession to unite the same together, means to fold protruding portions of the adhesive paper over on to the outer faces of the box heads, and means to fold other protruding portions of the adhesive paper against the inner faces of the box rim, the application of said rims to the forms, the insertion of the box heads, and the application and folding of the adhesive paper of the plurality of boxes occurring substantially simultaneously, substantially as described.

18. In a machine of the character described, the combination of a carrier, means to intermittently rotate said carrier, a plurality of rim forms on said carrier, each capable of rotation about its own axis, means to lock said rims against rotation on their axes, means to actuate said locks to unlock said forms, means to apply box rims to said forms in succession, means to insert box heads in the rims on the forms in succession, means to apply adhesive paper to the combined rims and heads in succession to fasten the same together, means to rotate said forms on their axes during the application of the adhesive paper, and a presser adapted to rub such adhesive paper on to the box during said rotation, such presser following the contour of the box, substantially as described.

19. In a machine of the character described, the combination of a carrier, means to intermittently rotate said carrier, a plurality of rim forms on said carrier capable of rotation about their own axes, means to lock said forms against rotation, means to actuate said locks whereby to unlock said forms, means to apply the completed box rims with flat sides to said forms in succession, means to apply box heads in said rims while on the forms in succession, means to apply adhesive paper to the combined rims and heads in succession to fasten the same together, means to rotate said forms, rims, and heads on the axes of the forms during the application of such adhesive paper, and a yielding presser adapted to rub such paper on the boxes and to follow the contour of the boxes during their rotation, substantially as described.

20. In a machine of the character described, the combination of a movable carrier, a rim form on said carrier adapted to rotate about its own axis, means to apply a completed box rim to said form, means to insert a box head in said rim while on the form, means to apply adhesive paper to the combined rim and head to fasten the same together, means to rotate the form, rim, and head about the axis of the form during the application of such paper, and a clamp associated with said form and acting automatically to clamp and hold the end of the adhesive paper during the application thereof to the boxes, substantially as described.

21. In a machine of the character described, the combination of a movable carrier, a rim form on said carrier capable of rotation about its own axis, means to apply a completed box rim with flat sides to said form, means to fasten a box head in said rim while on the form, means to rotate the form about its axis, means to apply adhesive paper during such rotation to the combined rim and head to fasten the same together, a spring-pressed clamp adapted to hold the end of such adhesive paper to the box during the application thereof to the rim, and cam means controlling the actuation of said clamp, substantially as described.

22. In a machine of the character described, the combination of an open-ended rim shell, a plurality of rim forms, means to bring said forms in succession into register with the open end of said shell, means to feed rims to said shell, and a sliding plunger in said shell adapted to discharge rims from the shell and applying them in succession to the forms, substantially as described.

23. In a machine of the character described, the combination of a plurality of rim forms, a rim shell having an enlarged inner portion and converging toward its mouth adjacent to the forms, means to bring said forms in succession into register with said shell, a sliding plunger in said shell, and means to feed rims to the enlarged portion of said shell, whereby the plunger by reciprocation in the shell is adapted to apply the rims to the forms bringing the rims to shape if distorted during their travel toward the retracted mouth of the shell, substantially as described.

24. In a machine of the character described, the combination of a shell for pasteboard box heads, means to feed heads to said shell, a plurality of circularly arranged box rim forms, means for causing each of said forms to register successively with said shell, a plunger in said shell, means to slide the shell and plunger toward the form, the shell guiding the plunger in its movement, said shell-sliding means retracting the shell leaving the plunger to hold the head to a rim on the form, and means to positively rotate both the form and plunger, substantially as described.

25. In a machine of the character described, the combination of a shell for pasteboard box heads, means to feed the heads to said shell, a box rim form, means to bring said form into register with said shell, a plunger in said shell, means to slide said shell and plunger toward the form, the shell guiding the plunger in this movement, said shell-sliding means retracting the shell leaving the plunger to hold the head to the rim, means to rotate said form and plunger, a slide in said shell controlling the feed of the heads thereto, and means whereby said plunger actuates said slide, substantially as described.

26. In a machine of the character described, the combination of a clamp, a rotary carrier provided with a plurality of box rim forms, means to bring said forms in succession into register with said clamp, means associated with said forms adapted to successively positively project the partially-completed boxes from said forms into said clamp, and means to subsequently open the clamp to free the boxes, substantially as described.

27. In a machine of the character described, the combination of a clamp, a rotary carrier provided with a plurality of box rim forms, means to bring said forms in succession into register with said clamp, means to discharge the partially-completed boxes from said forms into said clamp, a conveyer adjacent to said clamp, and means to open said clamp to permit the box held therein to fall upon the conveyer, substantially as described.

28. In a machine of the character described, the combination of a clamp having a spring-closed arm, a rotary carrier provided with a plurality of box rim forms, means to bring said forms in succession into register with said clamp, means to successively discharge the partially-completed boxes from said forms into said clamp, an endless belt conveyer adjacent to said clamp, and cam means to move said clamp arm whereby to free the box in the clamp and permit the same to fall upon the conveyer, substantially as described.

29. In a machine of the character described, the combination of a pasteboard box form adapted to accommodate a box rim, means for applying a box end to and holding the same against said box form, two pairs of folding fingers adapted to fold protruding portions of adhesive paper applied to the exterior of the rim of the box, said fingers being pivoted and spring-pressed, and sliding cams associated with said box-end holding means and adapted to operate said pairs of fingers in succession, substantially as described.

30. In a machine of the character described, the combination of a table, a plurality of fingers adapted to protrude above the top of the table to act as guides in positioning pasteboard boxes, means to fold adhesive paper applied to the boxes into the insides of the latter, a plunger adapted to enter the box, and means to operate said fingers to cause pressure on the sides of the box during the insertion of the plunger to cause the adherence of the paper to the inner face of the box rim, substantially as described.

31. In a machine of the character described, the combination of a table, a plurality of fingers adapted to protrude above the top of the table to act as guides in positioning pasteboard boxes, means to fold adhesive paper applied to the boxes into the insides of the latter, a plunger adapted to enter the boxes, means to slide said fingers, and means permitting said fingers to approach the boxes during such sliding movement whereby to cause pressure on the sides of the boxes while the plunger is inserted therein to cause the adherence of the paper to the inner face of the box rim, substantially as described.

32. In a machine of the character described, the combination of a pasteboard box form adapted to support a partially completed box with an adhesive covering applied to the rim, means to fold the projecting part of said covering over on to the head of the box, and means to cause the adhesion of said covering to said head including a movable plunger, means on said plunger adapted to engage the covering and press it against the head, means to bear on the uncovered part of the head during the retraction of said pressing means, and means to operate said plunger, substantially as described.

EUGENE A. TELFAIR.

Witnesses:
WALTER M. FULLER,
HENRY M. HUXLEY.